United States Patent
McLaughlin et al.

(10) Patent No.: US 11,948,147 B2
(45) Date of Patent: Apr. 2, 2024

(54) FALLBACK AUTHORIZATION ROUTING

(71) Applicant: Visa International Service Association, San Francisco, CA (US)

(72) Inventors: Robert Dean McLaughlin, Hampton Falls, NH (US); Balakrishnan Kannikeswaran, Foster City, CA (US); Biju Abraham, Fremont, CA (US); Roshin Joseph, Sunnyvale, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 17/580,084

(22) Filed: Jan. 20, 2022

(65) Prior Publication Data

US 2022/0147991 A1     May 12, 2022

Related U.S. Application Data

(63) Continuation of application No. 15/653,350, filed on Jul. 18, 2017, now Pat. No. 11,263,628.

(51) Int. Cl.
*G06Q 20/40*     (2012.01)
*G06Q 40/02*     (2023.01)
(Continued)

(52) U.S. Cl.
CPC .......... *G06Q 20/40* (2013.01); *G06Q 20/405* (2013.01); *G06Q 40/02* (2013.01); *G06Q 40/04* (2013.01); *H04L 5/20* (2013.01); *H04W 12/06* (2013.01)

(58) Field of Classification Search
None
See application file for complete search history.

(56) References Cited

U.S. PATENT DOCUMENTS

| 5,592,672 | A | 1/1997 | Grewal et al. |
| 7,127,422 | B1 | 10/2006 | Bundy |

(Continued)

FOREIGN PATENT DOCUMENTS

| CN | 101180840 A | 5/2008 |
| CN | 101427278 A | 5/2009 |

(Continued)

OTHER PUBLICATIONS

Office Action received for CN Appl. No. 201980093309.0, dated Jul. 29, 2022, 10 pages.
(Continued)

*Primary Examiner* — Joseph W. King
*Assistant Examiner* — Carol A See
(74) *Attorney, Agent, or Firm* — Kilpatrick Townsend & Stockton LLP

(57) ABSTRACT

Techniques are provided for fallback authorization routing. A merchant processor may receive authorization requests from one or more merchant systems. These authorization requests may be to authorize a transaction. The merchant processor may transmit these authorization requests over a first communication channel to an acquirer processor, which may then forward the requests to a payment network. If the merchant processor determines that the acquirer processor is not receiving the authorization requests, or is otherwise unavailable, the merchant processor may, as a fallback, transmit the authorization requests directly to the payment network through a second communication channel, thereby bypassing the acquirer processor. When the merchant processor receives some indication that the acquirer processor is available to process authorization requests, new authorization requests can be transmitted to the acquirer processor via the first communication channel.

16 Claims, 10 Drawing Sheets

(51) Int. Cl.
  *G06Q 40/04* (2012.01)
  *H04L 5/20* (2006.01)
  *H04W 12/06* (2021.01)

(56) References Cited

U.S. PATENT DOCUMENTS

| | | | |
|---|---|---|---|
| 7,725,351 | B1 | 5/2010 | Williams |
| 8,321,589 | B2 | 11/2012 | Ratica |
| 8,762,210 | B2 | 6/2014 | Balasubramanian |
| 10,498,897 | B1 | 12/2019 | Chadha et al. |
| 11,356,364 | B2 | 6/2022 | Abraham et al. |
| 2006/0010357 | A1* | 1/2006 | D'Alo ............... G06F 11/0757 714/E11.003 |
| 2007/0005774 | A1* | 1/2007 | Singh .................... H04L 67/56 709/227 |
| 2010/0106611 | A1* | 4/2010 | Paulsen ................ G07F 17/32 705/40 |
| 2012/0072347 | A1* | 3/2012 | Conway ............... H04L 45/308 705/44 |
| 2012/0221468 | A1* | 8/2012 | Kumnick ............ G06Q 20/306 705/44 |
| 2014/0197950 | A1 | 7/2014 | Shupp et al. |
| 2014/0358789 | A1 | 12/2014 | Boding et al. |
| 2015/0081541 | A1 | 3/2015 | Hogg |
| 2015/0332145 | A1 | 11/2015 | Vasseur et al. |
| 2017/0163629 | A1 | 6/2017 | Law et al. |
| 2017/0243207 | A1 | 8/2017 | Lorberg et al. |
| 2017/0364915 | A1 | 12/2017 | Levy et al. |
| 2018/0316599 | A1 | 11/2018 | Mcdonald |
| 2022/0086084 | A1 | 3/2022 | Abraham et al. |
| 2022/0147991 | A1 | 5/2022 | Mclaughlin et al. |
| 2022/0263755 | A1 | 8/2022 | Abraham et al. |

FOREIGN PATENT DOCUMENTS

| | | |
|---|---|---|
| CN | 108701295 A | 10/2018 |
| CN | 109074578 A | 12/2018 |
| CN | 109416790 A | 3/2019 |
| EP | 3422185 A1 | 1/2019 |
| JP | 2017092665 A | 5/2017 |
| WO | 2012/145701 A2 | 10/2012 |
| WO | 2016/084074 A1 | 6/2016 |
| WO | 2017/169471 A1 | 10/2017 |
| WO | 2020/222843 A1 | 11/2020 |

OTHER PUBLICATIONS

Office Action received for EP Appl. No. 18834728.0, dated Jul. 26, 2022, 8 pages.
XU, "Construction of Short-Block Nonbinary LDPC Codes Based on Cyclic Codes", IEEE, vol. 14, No. 8, Dec. 31, 2017, English translation of Abstract.
Xu, "Research on Resource Demand Forecasting and Optimal Allocation Method in Cloud Computing Environment", Chinese Master's Theses, Sep. 15, 2014, Summary.
Arctic Reservations, "Keep Business Running Smoothly with a Back Up Gateway Provider", Available online at : https://www.arcticreservations.com/blog/2045/06/keep-business-running-smoothly-with-a-back-up-gateway-provider, Jun. 10, 2015, 2 pages.
Welcome to the Engagement Bureau, Press Release, "Visa and MasterCard Support Common Solutions to Enable U.S. Chip Debit Routing", Available online at : http://new.sroom.mastercard.com/press-releases/visa-and-mastercard-support-common-solutions-to-enable-u-s-chip-debit-routing, Jul. 30, 2013, 3 pages.
"Smart Routing", U.S. Appl. No. 17/428,947, filed Aug. 5, 2021, 422 pages.
Extended European Search Report received for EP Appl. No. 18834728.0 dated Aug. 12, 2020, 9 pages.
International Preliminary Report on Patentability received for PCT/US2018/042104, dated Jan. 30, 2020, 8 pages.
International Search Report and Written Opinion received for PCT/US2018/042104, dated Nov. 27, 2018, 11 pages.
International Search Report and Written Opinion received for PCT/US2019/030265, dated Feb. 10, 2020, 8 pages.
Application No. CN201980093309.0, Notice of Decision to Grant, dated Jan. 5, 2023, 4 pages.
Notice of Allowance received for U.S. Application No. 17/428, 947 dated Feb. 7, 2022, 14 pages.
Office Action, dated Feb. 7, 2023, for Chinese Application No. CN201880048135.1, 13 pages.
Office Action, dated Jul. 15, 2023, for Chinese Application No. CN201880048135.1, 6 pages.
Notice of Allowance, dated Sep. 13, 2023, for U.S. Appl. No. 17/738,921, 17 pages.
Notice of Decision to Grant, dated Nov. 13, 2023, for Chinese Application No. CN201880048135.1, 4 pages.

* cited by examiner

FALLBACK AUTHORIZATION ROUTING

CROSS-REFERENCE TO RELATED APPLICATIONS

This application is a continuation application of U.S. patent application Ser. No. 15/653,350, filed Jul. 18, 2017, which is herein incorporated by reference in its entirety for all purposes.

BACKGROUND

Payment networks and payment gateways form the backbone of e-commerce infrastructure. Such computer networks enable merchants and customers to communicate with their respective acquirer and issuer banks, allowing seamless, near real-time transaction authorization and processing.

However, conventional authorization routing is failure prone. A large number of communication channels are involved in communicating between distinct acquirers, issuers, gateway servers, and payment processing networks. If the acquirer corresponding to a given merchant cannot be reached (either by infrastructure failure, system instability, maintenance, DDoS attack, etc.), the gateway server will be unable to route the authorization request through the network.

The result is that many authorization requests sent from one computer to a destination network address never reach the final destination address due to network issues. Thus, there is a need for new systems and methods for handling such network failures.

SUMMARY

Embodiments of the invention provide methods, apparatuses, and systems for fallback authorization routing. A merchant processor may receive authorization requests from one or more merchant systems. These authorization requests may be in the form of a request to authorize a transaction, such as a credit card transaction that takes place over the Internet. The merchant processor may transmit these authorization requests over a first communication channel to an acquirer processor, which may then forward the requests to a payment network. If the merchant processor determines that the acquirer processor is not receiving the authorization requests, or is otherwise unavailable, the merchant processor may, as a fallback, transmit the authorization requests directly to the payment network through a second communication channel, bypassing the acquirer processor. When the merchant processor receives some indication that the acquirer processor is available to process authorization requests, it may being to transmit new authorization requests to the acquirer processor via the first communication channel.

Embodiments of the invention provide for advantages over conventional systems and methods because conventional systems and methods used in authorizing transactions are unable to handle such failures. In a conventional system, if an acquirer processor corresponding to a given merchant is unavailable, the transaction cannot be authorized because the acquirer processor cannot receive the authorization message and forward it to the payment network. By contrast, embodiments of the invention provide bypassing the acquirer processor, thus allowing transactions to be authorized even if a given acquirer processor is unavailable. The result is a more seamless and efficient e-commerce environment.

Although the examples and language below focus on a transactional context, the methods and systems described below may be applicable to more general network systems. The fundamental aspect of some embodiments of the invention is the ability to bypass a typically necessary, but currently unavailable node in a network as a fallback during some process. The function of the bypassed node may be performed by another node, or during a later time period. This has advantages in many network schemes, particularly ones where both speed and reliability are important.

One such example is a network of hospital computers. A doctor might transmit a request for lab work that results in the prescription of one drug or another based on the lab results. This request may first pass through the pharmacist's computer, to let the pharmacist know that certain medications may be needed in the near future. The pharmacist's computer could then route the request to a lab computer, that returns the analysis to the pharmacist, indicating which prescription should be used. However, the pharmacist's computer may be unavailable. In this case, it is advantageous to bypass the pharmacists computer in the normal communication chain, send the request directly to the lab, and send the results to the pharmacist's computer when it becomes available. Although the prescriptions cannot be prepared ahead of time, the entire process does not halt because of a single computer or server unavailability.

A better understanding of the nature and advantages of embodiments of the present invention may be gained with reference to the following detailed description and the accompanying drawings.

TERMS

Figure 1:
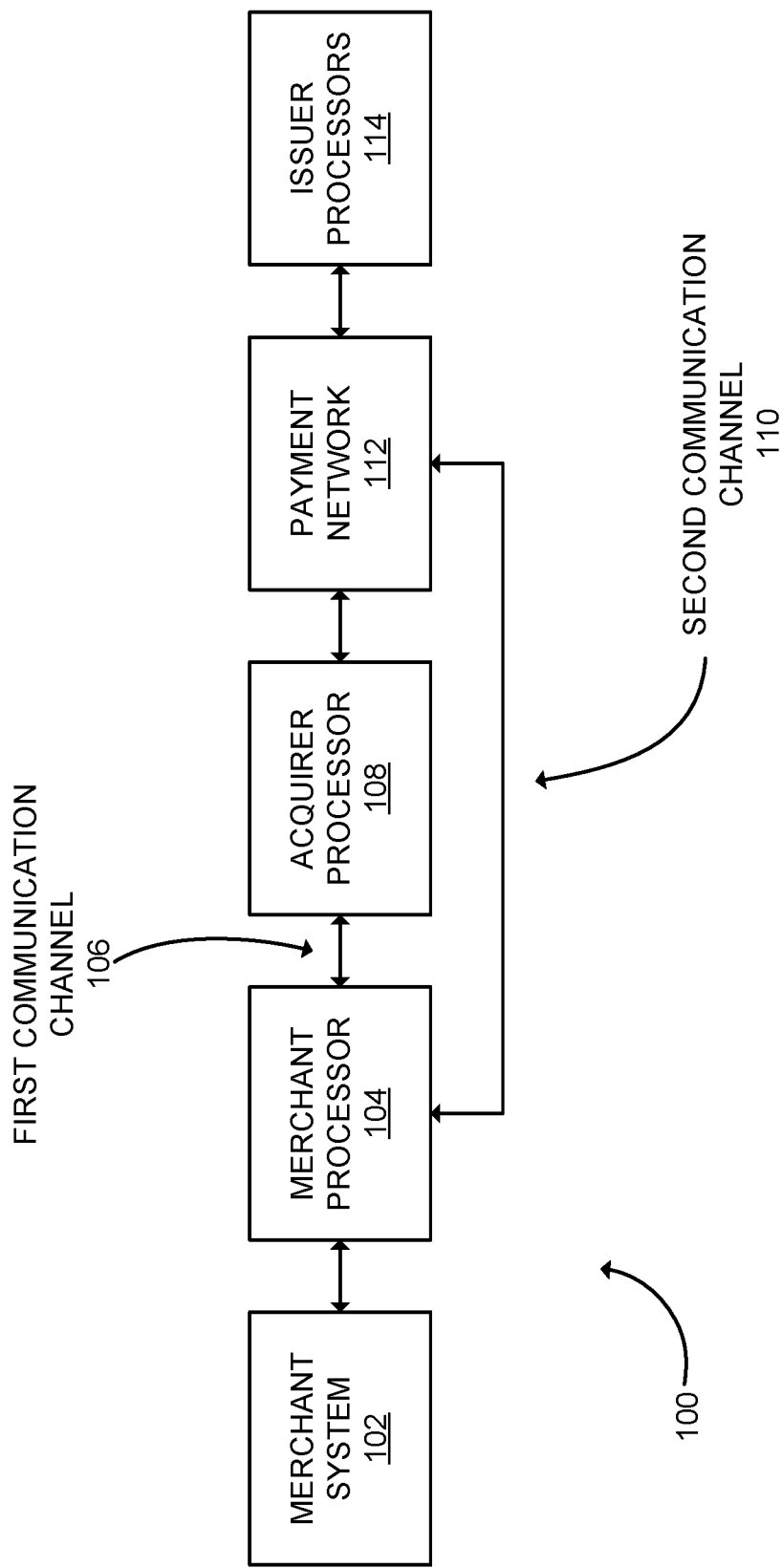
FIG. 1 is a block diagram showing an overview of an authorization routing system according to an embodiments of the invention.

Prior to discussing embodiments of the invention, description of some terms may be helpful in understanding embodiments of the invention.

The term "server computer," "server," or "gateway" may include a powerful computer or cluster of computers. For example, the server computer can be a large mainframe, a minicomputer cluster, or a group of computers functioning as a unit. In one example, the server computer may be a database server coupled to a web server. The server computer may be coupled to a database and may include any hardware, software, other logic, or combination of the preceding for servicing the requests from one or more other computers. The term "computer system" may generally refer to a system including one or more server computers coupled to one or more databases.

A "processor" may include hardware within a server computer (or other computing device) that carries out instructions embodied as code in a computer-readable medium. An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

The term "merchant computer system" (or just "merchant system") may refer to a computer system that engages in transactions and other electronic communications for providing access to goods or services.

The term "merchant processor gateway" (or just "merchant processor") may refer to a gateway computer that manages transactions for a merchant system. Such a gateway computer may handle routing authorization request messages and response messages on behalf of a merchant system, and may enable communication between a merchant system and an associated acquirer processor.

The term "acquirer processor server" (or just "acquirer processor") may refer to a server that processes electronic payment communications on behalf of a merchant system. An acquirer processor can receive authorization requests and settlement communications originating from a source address of a merchant system, as well as authorization responses from source addresses of issuer computers from which electronic payment message can also originate.

The term "issuer processor server" (or just "issuer processor") may refer to a server that receives authorization requests that are destined for a network address of the server. The issuer processor can access electronic records to determine an authorization response, thereby allowing a payment network to provide messages for other computers to coordinate authorization and settlement of a transaction.

The term "payment processing network" (or just "payment network") may refer to a server or network of computers that facilitates communication of messages and tracking of transaction information between computers. A payment network may facilitate debit or credit card transactions between an acquirer processor and an issuer processor.

The term "communication channel" may refer to a particular source address and destination address (including intermediate addresses for routing) for communicating between two computers corresponding to the addresses. The communication channel can refer to a particular protocol (e.g., HTTP, TCP, UDP, etc.) and may have a specific set of associated encryption keys. The addresses may also specify particular ports, and thus two destination addresses can have a same IP address, but different ports.

The term "authorization request message" or "authorization requests" may refer to an electronic message that is sent to a payment processing network and/or an issuer of a payment account to request authorization for a transaction. An authorization request message according to some embodiments may comply with ISO 8583, which is a standard for systems that exchange electronic transaction information associated with a payment made by a consumer using a payment device or payment account. The authorization request message may include a primary account number (PAN), or other identifying information, associated with a consumer payment device or payment account. An authorization request message may also comprise additional data elements corresponding to identification information including, by way of example only: a service code, a CVV/iCVV (card verification value), a dCVV (dynamic card verification value), a cryptogram (e.g., a unique cryptographic value for the transaction), an expiration date, etc. An authorization request message may also comprise transaction information, such as any information associated with a current transaction, such as the transaction amount, merchant identifier (e.g., MVV, "merchant verification value"), merchant location, merchant category code, etc., as well as any other information that may be utilized in determining whether to authorize a transaction.

An "authorization response message" or "authorization responses" may refer to a message reply to an authorization request message generated by an issuing financial institution or a payment network. The authorization response message may include, by way of example only, one or more of the following status indicators: Approval—transaction was approved; Decline—transaction was not approved; or call center—response pending more information, merchant must call the toll-free authorization phone number. The authorization response message may also include an authorization code, which may be a code that a credit card issuing bank returns in response to an authorization request message in an electronic message (either directly or through the payment network) to the merchant's access device (e.g., POS equipment) that indicates approval of the transaction. The code may serve as proof of authorization.

A "settlement message" can include an electronic message used to initiate the transfer of funds from an issuer to an acquirer, the funds being associated with an electronic payment transaction conducted at a merchant having a relationship with the acquirer. A settlement message according to some embodiments may comply with ISO 8583. Settlement can be initiated by a merchant, acquirer, gateway, or other suitable payment processing entity. Settlement messages can be generated and transmitted to a payment processing network and/or issuer periodically (e.g., daily) or sporadically. In some embodiments, a payment processing network can facilitate the transmission of a settlement message and an exchange of funds. For instance, upon receipt of a settlement message, a payment processing network can transmit the settlement message to an issuer. Funds can be transferred from the issuer to a settlement account designated by the payment processing network which can direct the funds from the settlement account to the acquirer which may deposit the funds (minus any fees owed to the acquirer) in a merchant account.

A "capture request" can include an electronic message used to "capture" funds authorized for a transaction. As an example, a customer may present their credit card to a merchant as part of a transaction. The merchant may then send an authorization request. When the merchant receives an authorization response, the transaction amount can be put on hold. In order to receive the transaction amount, the merchant can transmit a capture request before settlement can take place. A capture request is typically initiated by a merchant system, and typically transmitted to a merchant processor gateway, which may complete the capture process.

A "forced capture" can include a special variant of a capture request. In a forced capture, funds are manually captured for transactions that were authorized without the approval of an acquirer processor. A forced capture could occur when an acquirer processor is bypassed during an authorization request, and therefore has no record of a transaction being authorized.

The term "heartbeat message" may refer to a message sent to indicate whether the sending device is available or to determine whether a receiving device is available. Heartbeat messages can be sent periodically and continue to be sent while the sending entity is available. The absence of a heartbeat message may indicate that the sending entity is no longer available.

The term "handshake synchronization message" may refer to a message sent by one device to establish a communication channel with another device. The handshake synchronization message may be responded to with a handshake synchronization response message, indicating that the two entities are synchronized and capable of further communication.

DETAILED DESCRIPTION

The present disclosure provides for methods and systems for fallback authorization routing in networked systems, such as a hospital computer network, distributed database, or a system used to manage transactions and facilitate payment for goods and services using a credit card. In these networked systems there are multiple servers, computers, and processors which each have a role in the process. If a given computer is unavailable to perform its individual function in the network, the performance of the entire network suffers. The methods and systems disclosed provide a solution to this problem; enabling networks to perform their intended function even when an individual computer, server, or processor is unavailable.

An example of such a system is a distributed database. For security purposes, each computer in the network may only contains a single component of a given record. In doing so, a hacker or malicious user needs to compromise multiple computers in order to access a protected record.

The first computer in the "chain" may have entries such as the names of people. The second computer in the chain might hold social security numbers, and so on for the rest of the computers in the chain. If a legitimate user wishes to generate the entire record, they may provide the first computer in the chain with a request. The first computer may perform its intended function (i.e., returning its entry, such as a name or SSN), then forward the request to the next computer in the chain. That computer may in turn perform its function, and forward the request to further computers in the chain, until the entire record is produced and sent back to the user.

If the second computer in the chain is unavailable, it is unable to either perform its function or forward the request to further computers in the chain. The user will be unable to receive the record at all. However, by using a fallback method to bypass an individual entity in the network, the performance of the entire network is largely unaffected by the availability of a single member.

This is particularly advantageous in applications where accuracy and time sensitivity are both valuable. Typically, in internet based communication, there exists a trade-off between fast communication protocols such as the User Datagram Protocol ("UDP") and accurate communication protocols, such as the Transmission Control Protocol ("TCP"). Most applications where a computer or other entity needs to be authorized cannot make use of UDP, as identifying information needs to be transmitted accurately in order to be useful. TCP, or other more accurate protocols generally perform poorly over networks with unreliable connections because any interruption in complicated handshaking or error checking communications can cause the entire communication process to halt. By allowing for a bypass communication channel, embodiments of the invention provide for methods that may provide more reliable performance over unreliable networks, without sacrificing speed.

Returning to the distributed database example, the distributed database could include a default communication channel and a bypass communication channel. When a user requests a record and a single computer node is unavailable, the users request could be transmitted through the bypass channel. In this way, the record could be provided to a user even in the case of an unavailable computer, server, or processor. In some cases, the record could be complete except for the entries that would have been provided by the unavailable computer. In other cases, the network could provide for some redundancy, and another computer in the network could perform the functionality of the unavailable computer. As an additional example, the unavailable computer could provide its intended functionality (providing a specific entry of a sensitive record) at a later time when it becomes available.

Embodiments can include a system comprising one or more merchant systems, a merchant processor, an acquirer processor, a payment network, and issuer processors. In some embodiments, the merchant system or merchant computer systems create authorization requests that are sent through the network to the issuer processor. The merchant system receives authorization responses, which are sent through the network from the issuer processor. The merchant system also sends capture requests to the acquirer processor as part of a settlement process. The merchant processor may also communicate with the acquirer processor over a first communication channel. However, if the acquirer processor is not available, the acquirer processor may communicate with a payment network over a second communication channel (the bypass channel). In doing so, authorization can be received by the merchant processor, even if the acquirer processor is unavailable. This provides a considerable advantage over conventional systems and methods of authorizing transactions.

The various computers and other network entities and how they interact and communicate with one another using a normal communication channel and a bypass communication channel is described below, along with a description of some of the individual entities themselves. Methods by which the merchant processor may route transactions through different communication channels depending on the availability of an acquirer processor are also provided. Examples of determining the availability of the acquirer processor on the network is followed by a discussion of how data may be stored and messages may be communicated among the network entities in an alternative settlement process.

I. System Including Bypass Communication Channel

The system according to some embodiments of the invention includes a series of computers, servers, and processors. These include a merchant system, a merchant processor, an acquirer processor, a payment network, and issuer processors. Authorization requests and responses are routed between the merchant system, the acquirer processor, and the issuer processors by the merchant processor and the payment network. When the acquirer processor is available to route authorization requests and responses, the merchant processor communicates with the acquirer processor over a first communication channel. When the acquirer processor is unavailable to route authorization requests and responses, the merchant processor communicates directly with the payment network over a second communication channel. The second communication channel serves as a bypass in the case of an unavailable acquirer processor. By serving as a bypass, the second communication channel allows for network communication even if the acquirer processor is unavailable.

The system according to some embodiments of the invention allows capture requests to be routed between the computers and servers in the system. Notably, capture requests corresponding to transactions authorized over the second (bypass) communication channel can be routed to the acquirer processor over the first communication channel when it is available.

A. Overview of System

FIG. 1 is a block diagram showing an overview of the authorization routing system 100 according to embodiments of the invention. As shown, system 100 includes merchant system 102, merchant processor 104, first communication channel 106, acquirer processor 108, second communication channel 110, payment network 112, and issuer processor 114. Other network devices may exist between the individual network computers shown, e.g., Internet routers, whose function is known to one skilled in the art. In the example shown, merchant processor 104 can use two different channels for sending an authorization request to a final destination of issuer processors 114.

The merchant system 102, including a computer server connected to the Internet, may communicate electronically with client computers, e.g., over the Internet or another network. The merchant system 102 may receive identifying information from client computers. This information may take different forms depending on the context of the communication.

In some embodiments, the merchant system 102 may receive identifying information such as an IP or MAC address from a client computer, e.g., in implementations where a client computer is authenticated. In cases where security is more important, the merchant system 102 may receive a hash that can be verified by the merchant system 102 or by an issuer processor 114. In other cases, the merchant system 102 may receive an encrypted message. The merchant system 102 or the issuer processor 114 may decrypt the message and compare it to an expected message. If the decrypted message matches the expected message, the client computer can be identified. Identifying information may also take the form of payment credentials from consumers, such as a Personal Account Number or PAN, as well as other credentials or identifying information, such as a home address, zip code, credit card CVV2 value, credit card expiration date, and full legal name.

The merchant system 102 can additionally generate authorization requests. The authorization requests can relate to an interaction between the merchant system 102 and a client computer. For example, the merchant system 102 may generate an authorization request in order to request authorization from a third party for an interaction between the merchant system 102 and a client computer. In some embodiments, the third party or parties in question are the issuer processors 114. Authorization request messages may be encrypted or unencrypted, sent over a direct or distributed network (such as the Internet), and take any suitable form for electronic communication.

As another example, a client computer may request a protected or sensitive record from the merchant system 102, such as a patient medical history record. The client computer may provide identifying information to the merchant system, such as a user ID and password. The merchant system 102 may generate an authorization request message in order to verify the identity of the client computer, in order to determine if the client computer is authorized to receive the medical history record.

As another example, a client computer may belong to a consumer, who wishes to acquire a good or service from the merchant system 102. The client computer may provide identifying information, such as a PAN. The merchant system may generate an authorization request message, including the PAN, and transmit it in order to receive authorization to complete a transaction.

The merchant processor 104 can receive authorization requests or other requests from merchant systems and service those requests. Examples of other requests include settlement requests and "capture requests" or "requests for capture." The merchant processor 104 may take the form of a payment gateway that provides access to the communication infrastructure shown in system 100 for many merchant systems, e.g., by parsing and analyzing the content of payment request messages. The merchant processor 104 can provide functionality other than providing access to an authorization infrastructure, e.g., generating a record of those requests.

As part of providing access to the authorization infrastructure, the merchant processor 104 can establish communication over a first communication channel 106 with acquirer processor 108. In some embodiments, merchant processor 104 can communicate with various acquirer processors. To identify the correct acquirer processor for a given transaction, the merchant processor 104 can analyze an authorization response message to identify an identifier corresponding to the acquirer processor 108. As another example, the merchant processor 104 can store a merchant profile corresponding to each merchant system that the merchant processor 104 services, where the merchant profile specifies the acquirer processor for routing authorization requests from that merchant system.

To address temporary availability issues that may be detected with acquirer processor 108, the merchant processor 104 can communicate more directly with a payment network 112 over a second communication channel 110. Accordingly, the merchant processor 104 can transmit authorization request messages over either the first communication channel 106 or the second communication channel 110 to either the acquirer processor 108 or the payment network 112 respectively. The merchant processor 104 may further be able to receive authorization response messages from either the acquirer processor 108 over the first communication channel 106 or from the payment network 112 over the second communication channel 110, and then transmit said authorization response messages to the merchant system 102.

As mentioned above, the merchant processor 104 may be capable of determining the availability of the acquirer processor 108. Based on the availability of the acquirer processor 108, the merchant processor 104 can determine the communication channel for transmitting authorization request messages. As an example, if the merchant processor 104 determines that the acquirer processor 108 is available, the first communication channel 106 can be selected. If the merchant processor 104 determines the acquirer processor 108 is unavailable, the second communication channel 110 can be selected, thus bypassing the currently failed route through the acquirer processor 108.

As stated above, inclusion of a second communication channel 110 presents a number of advantages. The second communication channel 110 enables communication that requires authorization even when the acquirer processor 108 is unavailable. Applications such as accessing a private or sensitive record, verifying identity, or performing a transaction may require authorization in some form. If an acquirer processor is unavailable during the authorization process, authorization cannot be completed, and thus the application cannot be completed. By using the second communication channel 110, the authorization process can be completed even if the acquirer processor 108 is unavailable.

The acquirer processor 108 can manage an account for merchant system 102. The acquirer processor 108 routes requests, such as authorization request messages, authorization response messages, settlement requests, or capture requests.

As part of settlement, the acquirer processor 108 can debit or credit the merchant account associated with the merchant system 102.

The acquirer processor 108 may also communicate with a payment network 112. These communications may take place electronically over the internet or through another suitable network. These communications primarily take the form of authorization requests, authorization responses, settlement requests, or other settlement messages, although they could take other forms depending on the needs of the acquirer processor 108 or the issuer processors 114. For example, an acquirer processor 108 and an issuer processor 114 may be in disagreement regarding the status of a settlement request. In this case, the acquirer processor 108 may communicate with the payment network 112 to facilitate communication with the issuer processor. In general, the acquirer processor 108 can communicate with the payment network 112 for routing the communications to their intended recipient, e.g., a specific issuer processor 114.

The payment network 112 can facilitate communication of messages and tracking of transaction information between one or more acquirer processors (e.g., the acquirer processor 108) and one or more issuer processors (e.g., the issuer processor 114). For example, the payment network 112 can receive an authorization request message from the acquirer processor 108 and analyze the authorization request message to determine that the issuer processor 114 is associated with the authorization request message. Such identification of the corresponding issuer processor can be performed by analyzing a portion of the account number that corresponds to a bank identification number (BIN), which can be used to access a database that has the corresponding issuer processor stored in association with the BIN. The payment network 112 can forward the authorization message received from the acquirer processor 108 to the issuer processor 114 for authorization. The payment network 112 can then receive authorization response messages from the issuer processor 114 and further transmit the authorization response messages to the acquirer processor 108.

The issuer processor 114 can receive and analyze authorization request messages, e.g., to identify a stored record that corresponds to the account information provided in the request. Authorization response messages can then be created. Such authorization response messages may contain an indication of whether or not the transaction corresponding to the authorization request message is authorized, as well as information regarding the authorization status of the request or other information. Such information may include a status indicator (such as approval, decline or call center). It may also include a timestamp, which indicates the time at which the authorization request was sent and the time at which the authorization response was sent. This information may also include an authorization code, which may serve as proof of authorization. The authorization code may be used as part of a later capture request. Authorization codes and other information related to the authorization status may be useful for the purposes of record keeping, as capture requests frequently take place at a later time than authorization requests.

The network computers in FIG. 1 may communicate over a distributed network such as the Internet, or via a series of direct connections, a hybrid of the two, or any other appropriate method of communication between entities. Further, in some embodiments, there may be multiple merchant systems, merchant processors, acquirer processors, payment networks, or issuer processors. Additionally, there may be one or more client devices that interface with the merchant system as part of a transaction.

B. Sequence Diagram

Figure 2:
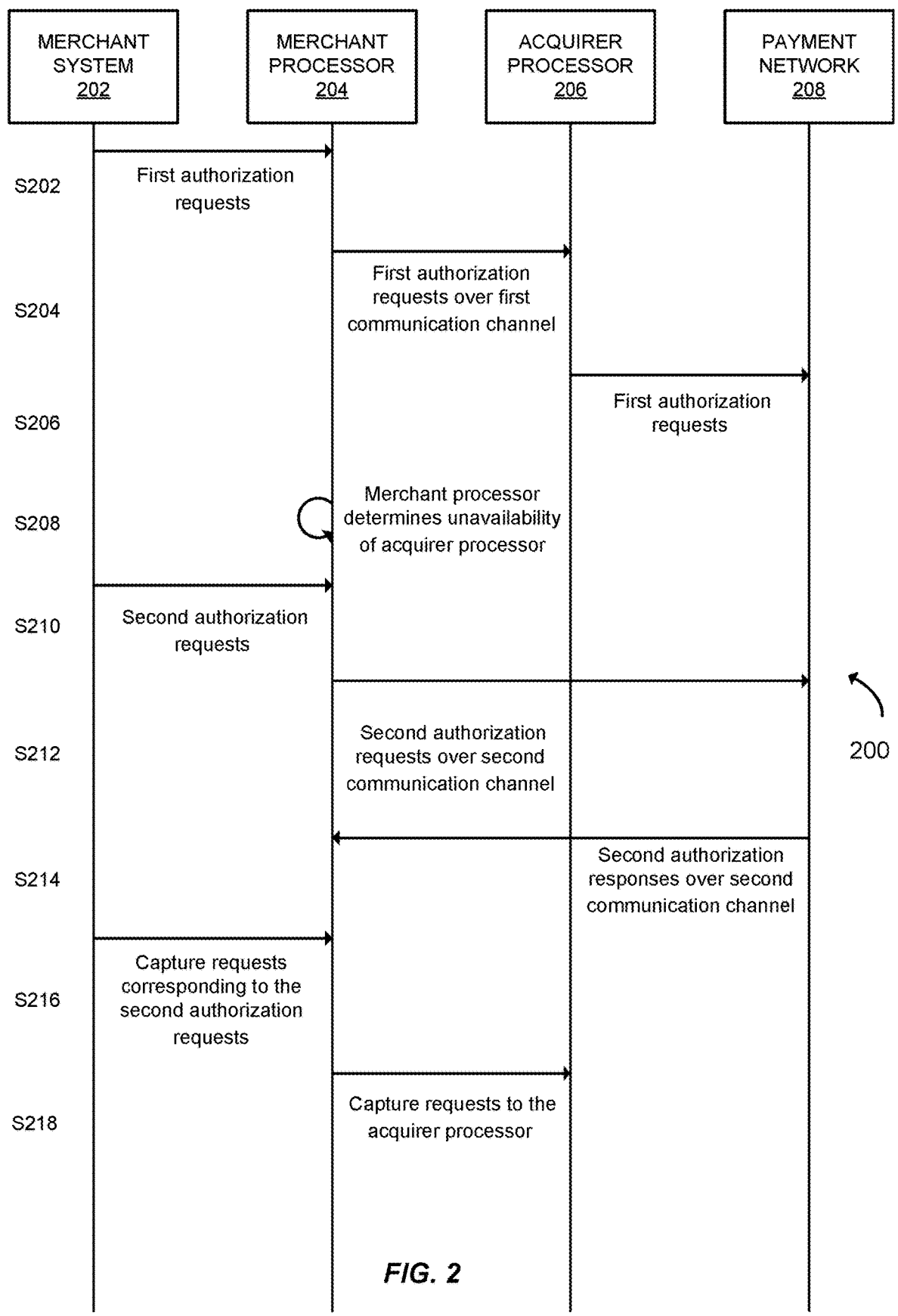
FIG. 2 is a sequence diagram showing a bypass routing of messages according to embodiments of the invention.

FIG. 2 is a sequence diagram showing a method 200 detailing fallback authorization routing according to embodiments of the invention. The merchant system 202, merchant processor 204, acquirer processor 206, and payment network 208 correspond to the merchant system 102, merchant processor 104, acquirer processor 108, and payment network 112 from FIG. 1, respectively.

At step S202, the merchant processor 204 receives first authorization requests from the merchant system 202. These authorization requests may comply with ISO 8583, or another standard for electronic communications, and may include identifying information that may be used for authorization, such as a username, password, PAN, or any of the other examples of identifying information recited above, among other forms of identifying information. The number of first authorization requests may depend on the nature of the merchant system 202 and its interactions with clients or other entities. For example, the merchant processor may receive 100 first authorization requests (e.g., over a certain time period, such as one hour), or, in the case of a smaller merchant system, it may only receive one or two.

At step S204, the merchant processor 204 sends the first authorization requests to the acquirer processor 206 over the first communication channel. The communication channel may exist in the internet or another network, and the authorization requests may be sent in any appropriate format, e.g., using any appropriate transmission protocol, such as TCP. Communications over the first communication channel between the merchant processor 204 and acquirer processor 206 may be encrypted.

At step S206, the acquirer processor 206 forwards the first authorization requests to a payment network 208. The payment network 208 is then able to determine appropriate issuer processor(s) and route the first payment requests to those issuer processor(s). As with the previous two steps, such communication can take place over a direct connection or via a network such as the Internet, and may adhere to any appropriate standards and use any appropriate transmission protocol or scheme. Although not shown, first authorization responses can be sent by the issuer processor(s) back through the network computers to merchant system 202.

At step S208, the merchant processor 204 determines the unavailability of the acquirer processor 206. In some embodiments, this determination may involve analysis of the receipt rate of the first authorization requests. As an example, the merchant processor 204 could compare the number of first authorization requests sent to the acquirer processor 206 versus the number of first authorization requests acknowledged (e.g., by an acknowledgement message) as being received by the acquirer processor 206. The merchant processor 204 could further determine a ratio of the number of first authorization requests received by the acquirer processor 206 versus the number of first authorization requests sent to the acquirer processor 206. This ratio could be compared to a predetermined threshold in order to determine the unavailability of the acquirer processor 206.

If, for example, the predetermined threshold is 0.8, 100 first authorization requests were sent by the merchant processor 204 to the acquirer processor 206, and 45 first authorization requests were acknowledged as received, the ratio equals 0.45, which is less than the threshold of 0.8, thereby indicating the acquirer processor 206 is unavailable.

Determining the number of authorization requests received can be accomplished in a number of ways. For example, the acquirer processor 206 may transmit an electronic receipt message to the merchant processor 204 for each of the first authorization request messages. This electronic receipt message may indicate that the acquirer processor 206 has received the given first authorization request. In other cases, it may be appropriate to use different messages to indicate the number of authorization requests received.

For example, according to TCP, computers send a series of handshake messages back and forth in order to establish a communication channel. It is presumed that once a communication channel has been established, the message will be received by the receiving party, in this case the acquirer processor 206. If a handshake message is not received, the communication channel cannot be established, and a given first authorization request cannot be received by the acquirer processor 206. Thus, the ratio of the number of first authorization requests received to the total number of first authorization requests can be calculated based on the number of handshake messages received over the number of first authorization requests sent.

Other methods can be used to determine the unavailability of the acquirer processor 206. In some embodiments, heartbeat messages are used to determine the availability of acquirer processor 206. Heartbeat messages are typically short messages, and are typically sent at a predetermined rate to one or more computers in a network. The heartbeat messages indicate to their recipient that the computer sending the heartbeat messages is available for communication. In some embodiments, the merchant processor 204 may receive heartbeat messages periodically from the acquirer processor 206. The merchant processor 204 may compare the number of heartbeat messages received to an expected number of heartbeat messages in order to determine the availability of the acquirer processor 206. Further, the merchant processor 204 may determine a ratio of the number of heartbeat messages received to the expected number of heartbeat messages and compare the ratio to a predetermined threshold.

If, for example, the threshold is 0.8 and the heartbeat messages are sent on average once per second, the merchant processor 204 can calculate the expected number of heartbeat messages received over an arbitrary time period. As an example, over the course of 30 minutes, the merchant processor expects to receive 1800 heartbeat messages. If the merchant processor instead receives 1000 heartbeat messages, then the ratio of received heartbeat messages to expected heartbeat messages is 0.556, which is less than the threshold of 0.8; and thus the acquirer processor 206 is determined to be unavailable.

Figure 6:
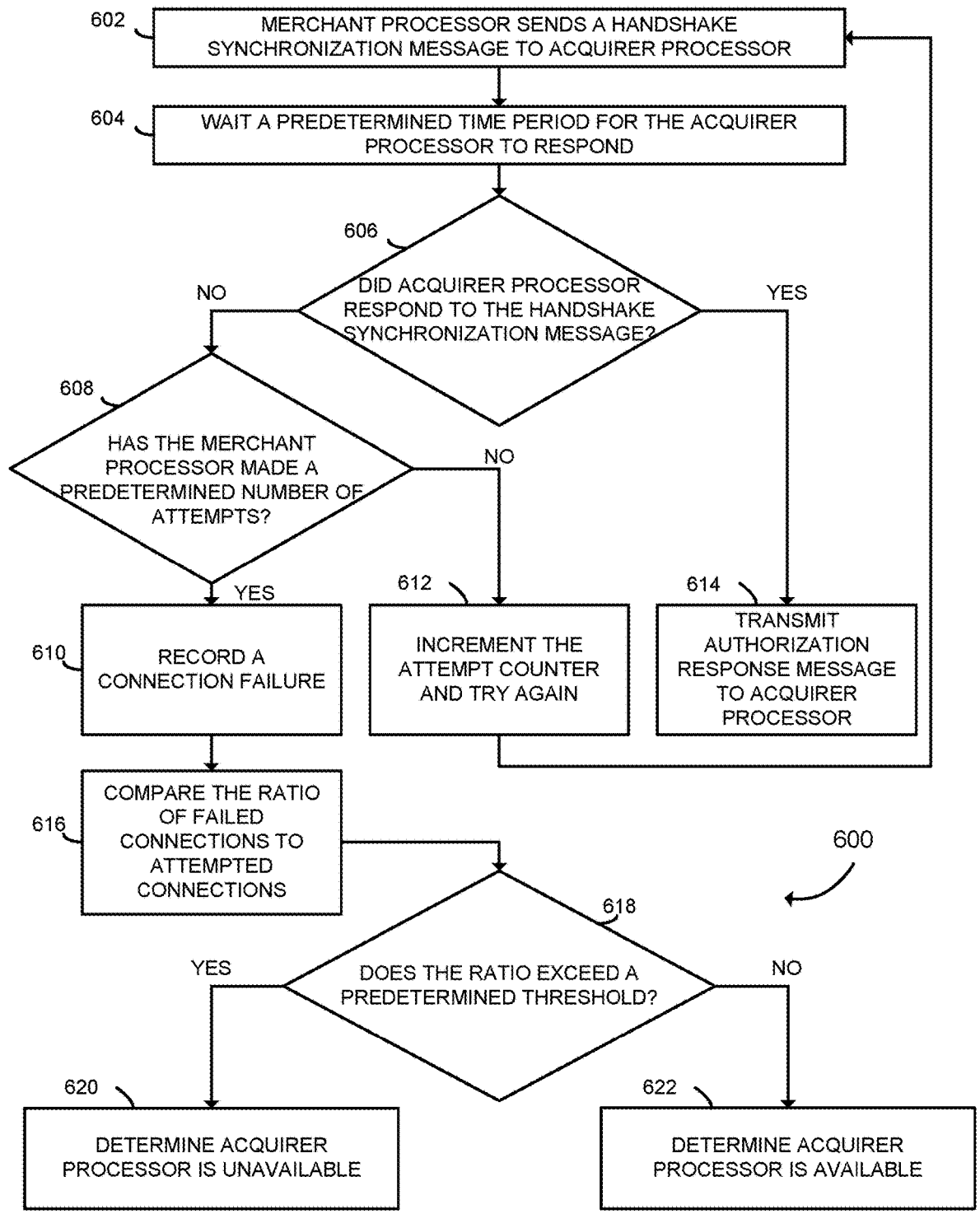
FIG. 6 is a flowchart showing a method of determining acquirer processor availability using handshake messages according to embodiments of the invention.
Figure 7:
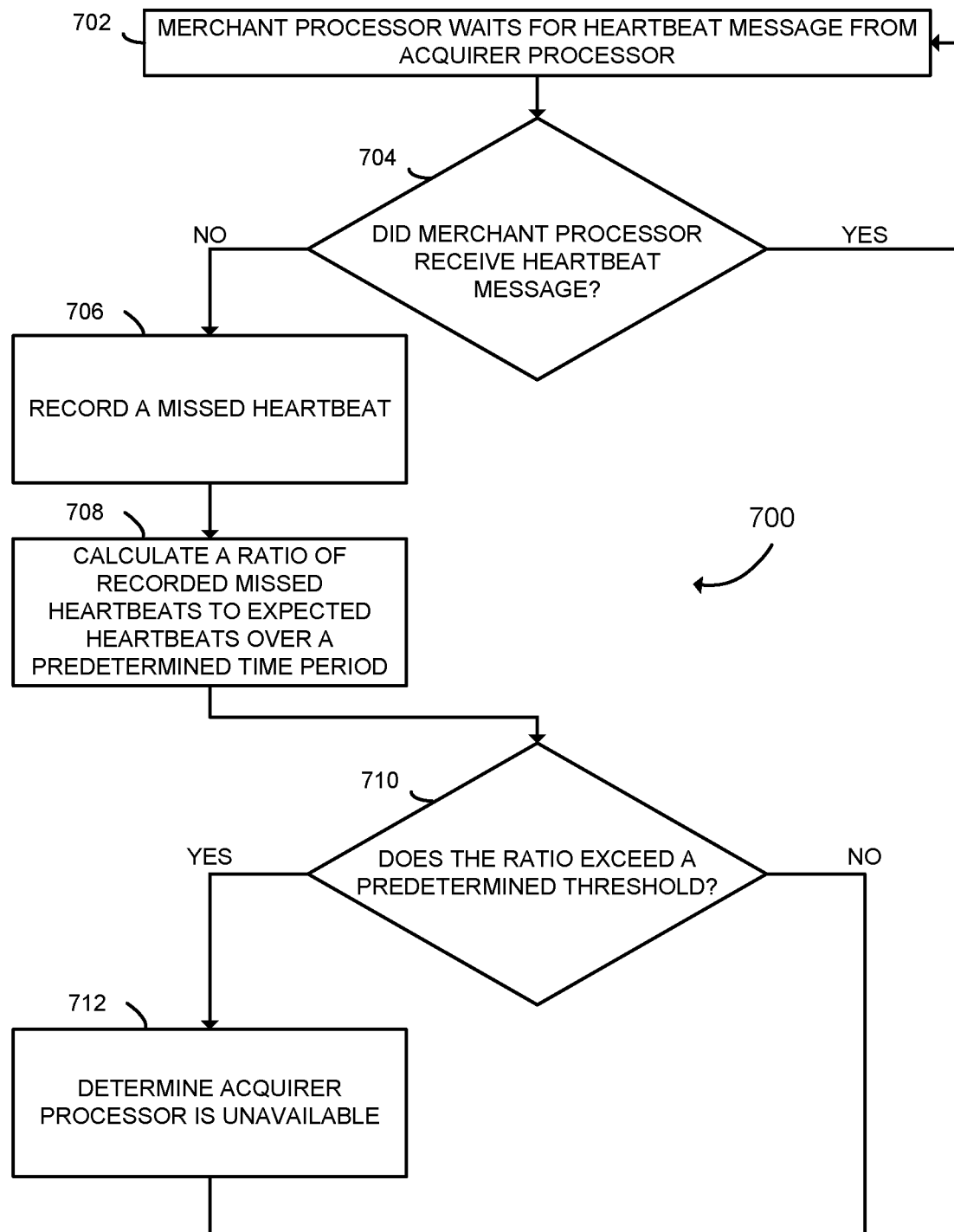
FIG. 7 is a flowchart showing a method of determining acquirer processor availability using heartbeat messages according to embodiments of the invention.
Figure 8:
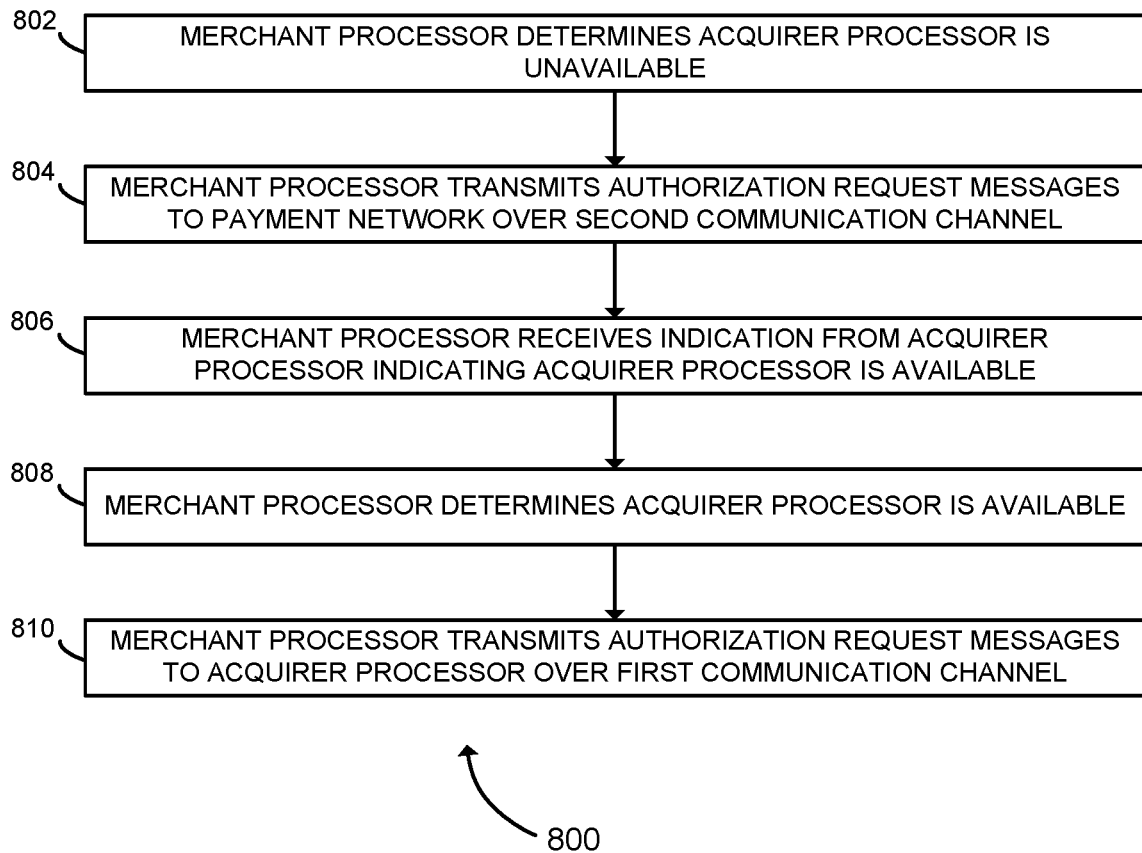
FIG. 8 is a flowchart showing a method of determining acquirer processor availability by receiving an indication from the acquirer processor according to embodiments of the invention.

Methods used to determine the availability or unavailability of the acquirer processor 206 are discussed further in Section II, and displayed in FIGS. 6-8. Determining that the acquirer processor 206 is unavailable indicates to the merchant processor 204 that it should route subsequent authorization requests through the second communication channel in order to complete the authorization process.

At step S210, the merchant processer 204 receives second authorization requests from the merchant system 202. The second authorization requests may be substantially similar to the first authorization requests, but may correspond to different issuer processors.

At step S212, the merchant processor 204 sends the second authorization requests to the payment network 208 over the second communication channel. In this way, the merchant processor 204, not the acquirer processor 206, communicates with the payment network 208 so that the payment network can route the second authorization requests to the appropriate issuer processors.

At step S214, the merchant processor 204 receives second authorization responses over the second communication channel from the payment network 208. Notably, the acquirer processor 206 is bypassed both during the transmission of authorization request messages and authorization response messages.

At stated above, authorization response messages may include a status or status code which indicates the status of the authorization. For example, a status code may include "approved" indicating that authorization was completed successfully and the merchant system 202 is authorized to perform some function, such as releasing a protected or sensitive resource to a client, or completing a transaction. Other such status requests may include "denied," indicating that the merchant system 202 is not authorized to perform some function, or "call center," indicating that the merchant system 202 needs to communicate directly with an issuer processor computer in order to receive authorization.

At step S216, the merchant processor 204 receives capture requests corresponding to the second authorization request messages. The content and use of capture requests can depend on the context of the authorization process. For a transaction, such as an e-commerce transaction, the capture request can indicate that the merchant wishes to capture funds set aside for the transaction during the authorization period. This further indicates to the merchant processor 204, the acquirer processor 206, the payment network 208, and an issuer processor that the merchant wishes to receive payment in the amount of the capture during the settlement process. Additionally, the capture request may include an authorization code, which indicates to other computers, processors, and servers that authorization was received.

At step S218, the merchant processor 204 sends the capture requests to the acquirer processor 206 as part of a settlement process. The settlement process can take various forms depending on the nature of the authorization process. For a transaction, a settlement involves the debiting and crediting of accounts managed by the acquirer processor 206 and an issuer processor. However, in other contexts, the settlement process could take other forms.

As an example, consider a distributed database where a client computer is only allowed to access a protected resource a limited number of times. The authorization request can indicate that a requesting computer wants to know if the client computer should be given access to the protected resource. When the authorization process is finished, the capture request can indicate that the requesting computer wants to settle, which can result in updating the database to indicate that the client computer has accessed the protected resource, and should therefore have the number of remaining accesses reduced.

C. Merchant Processor

Figure 3:
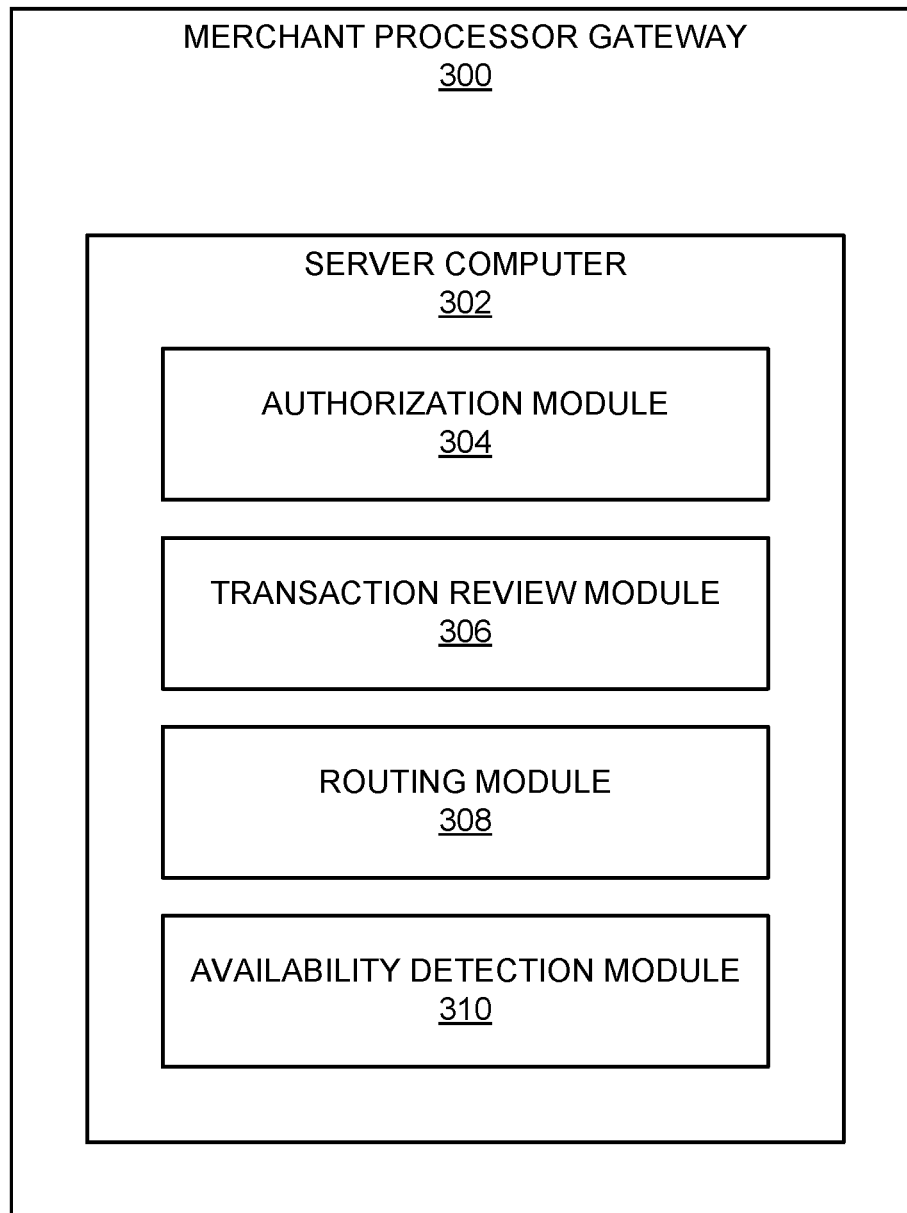
FIG. 3 is a block diagram showing a merchant processor gateway according to embodiments of the invention.

As depicted in FIG. 3, the merchant processor 300 may comprise a server computer 302 comprising an authorization module 304, a transaction review module 306, a routing module 308, and an availability detection module 310. The various modules may be embodied by computer code residing on a computer readable media.

The authorization module 304 may process authorization requests and responses. This may involve interpreting the contents of the message to determine the message's final recipient and the status of the authorization. It may also involve storing some or all of the information in a database for future access. In cases where the acquirer processor is bypassed, the merchant processor may provide some authorization information to the acquirer processor at a later time. In doing so, the acquirer processor can be informed of transactions that occurred during a period of time when the acquirer processor was unavailable.

The authorization module 304 may additionally decrypt or encrypt authorization requests and responses. As an example, the authorization module 304 may decrypt an authorization response message in order to extract and interpret the content of the message. Before the authorization response message is sent to the appropriate merchant computer system, the authorization module 304 may encrypt the message again for safe transmission.

The transaction review module 306 may analyze the transaction to identify whether specified criteria are met or otherwise conduct a fraud evaluation for transactions. If the transaction review module 306 determines that the transaction may be fraudulent, then transaction review module 306 may determine that the transaction should be denied and not forwarded to other network entities for the purpose of obtaining an authorization response message. If the transaction review module 306 determines that the transaction is not fraudulent, the transaction review module 306 may determine that the transaction should be allowed. If the transaction review module 306 is unable to determine whether the transaction is fraudulent, the transaction review module 306 can send the transaction to the acquirer processor or the payment network for further review.

The routing module 308 may route authorization requests and authorization responses to the appropriate destination. This may involve evaluating network addresses, and determining an appropriate communication protocol or standard. Further, the routing module may format the authorization requests or responses such that they conform to the appropriate communication protocol. As an example, the routing module 308 may determine that routing an authorization request to the acquirer processor requires the use of the Transmission Control Protocol, and the message should conform to ISO 8583. The routing module may format the message such that it confirms to both the protocol and the standard, then route the message to the acquirer processor for further processing. Additionally, the routing module 308 can route the message directly to the payment network through a second communication channel when the acquirer processor is detected as being unavailable. If the transaction is determined to be fraudulent, the routing module 308 can send an authorization response message to the merchant computer system, indicating that the transaction has been denied.

The availability detection module 310 may comprise software or specialized hardware in order to detect the availability of the acquirer processor. This may involve recording, counting, and/or analyzing handshake messages, authorization response messages, acknowledgement messages, and/or heartbeat messages in order to determine whether or not the acquirer processor is available. The availability detection module 310 may communicate with both the authorization module 304 and the routing module 308 in order to determine the correct destination for the authorization request or authorization response, and in order to route the authorization request and response to the correct destination. Methods of detecting the availability or unavailability of the acquirer processor are discussed in further detail below.

D. Payment Network

Figure 4:
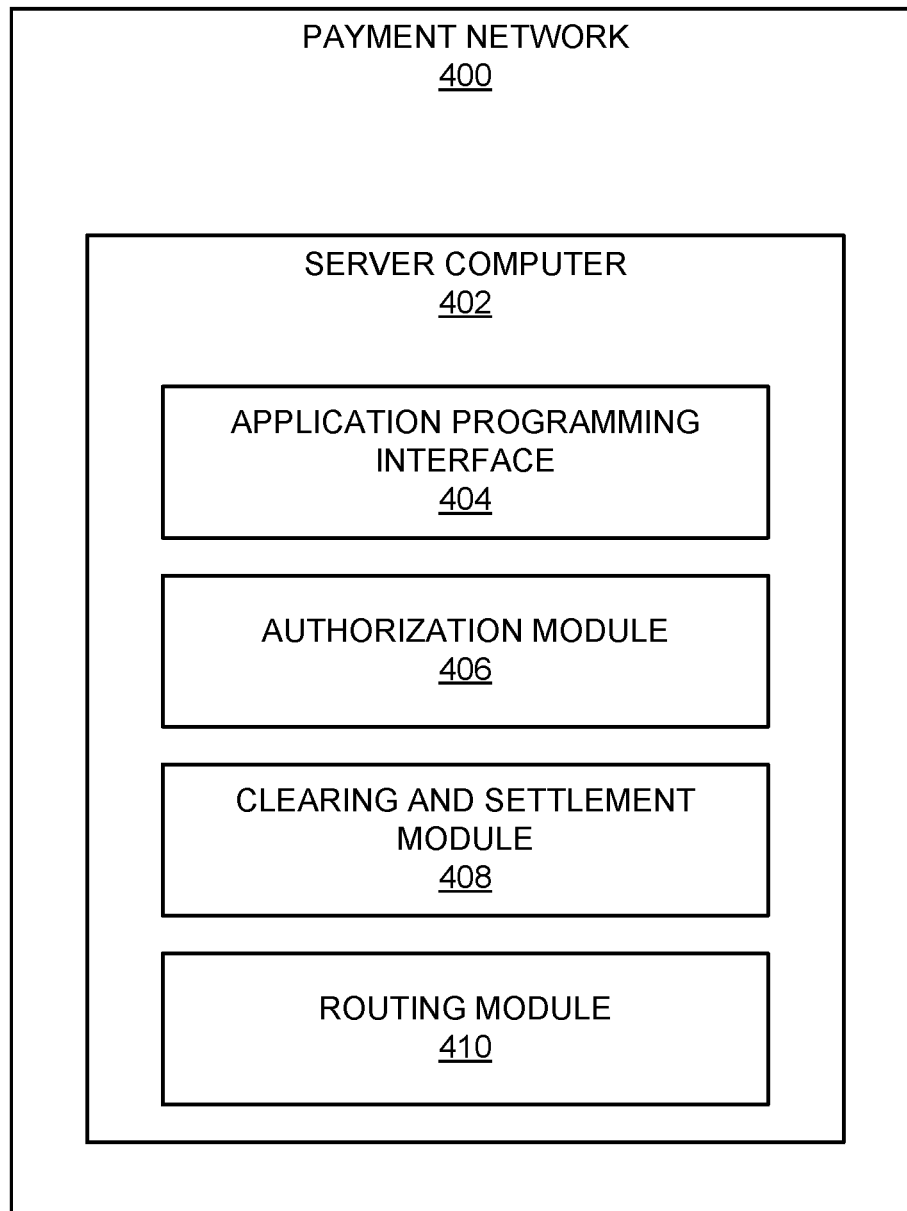
FIG. 4 is a block diagram showing a payment network according to embodiments of the invention.

As depicted in FIG. 4, the payment network 400 may comprise a server computer 402 comprising an application programming interface 404, an authorization module 406, a clearing and settlement module 408, and a routing module 410. The various modules may be embodied by computer code, residing on computer readable media.

The payment network 400 may include data processing subsystems, networks, and operations used to support and deliver authorization services, exception file services, and clearing and settlement services. An exemplary payment processing network may include VisaNet™. Networks that include VisaNet™ are able to process credit card transactions, debit card transactions, and other types of commercial transactions. VisaNet™, in particular, includes an integrated payments systems that processes authorization requests and a Base II system which performs clearing and settlement services. The payment network 400 may use any suitable wired or wireless network, including the Internet.

The server computer 402 may include any hardware, software, other logic, or combination of the preceding for servicing the requests from one or more client computers. The server computer 402 may comprise one or more computational apparatuses and may use any of a variety of computing structures, arrangements, and compilations for servicing the requests from one or more client computers.

The application programming interface (API) 404 may include a set of software, such as subroutine definitions, protocols, and tools for building application software. Communications with other network computers can specify a particular IP address and port, which may correspond to a particular API. A subroutine associated with that address can expect a particular format of messages and parse the messages according to a particular protocol.

The authorization module 406 may process authorization requests and responses. This may involve interpreting the contents of the message to determine the message's final recipient, and the status of the authorization. It may also involve storing some or all of the information in a database for future access. In cases where the acquirer processor is bypassed, the payment network 400 may provide some authorization information to the acquirer processor at a later time. In doing so, the acquirer processor can be informed about transactions which occurred during a period of time when the acquirer processor was unavailable.

The authorization module 406 may additionally decrypt or encrypt authorization requests and responses. As an example, the authorization module 406 may decrypt an authorization response message in order to extract and interpret the content of the message. Before the authorization response message is sent to the appropriate acquirer processor or merchant processor, the authorization module 406 may encrypt the message again for safe transmission.

The clearing and settlement module 408 can be used for the clearing and settlement of transactions. Module 408 can authenticate user information and organize the settlement process of user accounts between the acquirer processor and the issuer processor. An example of the clearing and settlement module 408 is Base II, which provides clearing, settlement, and other interchange-related services to VISA members.

The routing module 410 may route authorization requests and authorization responses to the appropriate destination. This may involve evaluating network addresses and determining an appropriate communication protocol or standard. Further, the routing module 410 may format the authorization requests or responses such that they conform to the appropriate communication protocol. As an example, the routing module 410 may determine that routing an authorization response message to the acquirer processor requires the use of the Transmission Control Protocol (TCP) and that the message should conform to ISO 8583. The routing module 410 may format the message such that it conforms to both the protocol and the standard, then route the message to the acquirer processor for further processing. Additionally, the routing module 410 can route the message directly to the merchant processor through a second communication channel when the acquirer processor is detected as being unavailable.

The routing module 410 may also determine the source of any received authorization requests or responses, or the communication channel through which authorization requests or responses were received. In doing so, the routing module 410 can enable the payment network 400 to determine the correct destination of subsequent authorization requests or responses. For example, if the routing module 410 determines that it received authorization requests over the second communication channel, that implies that the acquirer processor is unavailable. This means that the routing module 410 should route any authorization responses through the second communication channel directly to the merchant processor, bypassing the acquirer processor.

II. Method

In general terms, the method according to embodiments of the invention involves the merchant processor facilitating the transmission of authorization request and response messages through either a first or second communication channel depending on the availability of the acquirer processor. This involves first receiving authorization request messages, then determining the availability of the acquirer processor, routing the authorization request messages through the appropriate communication channel, receiving authorization response messages, and facilitating a clearing and settlement process.

Figure 5:
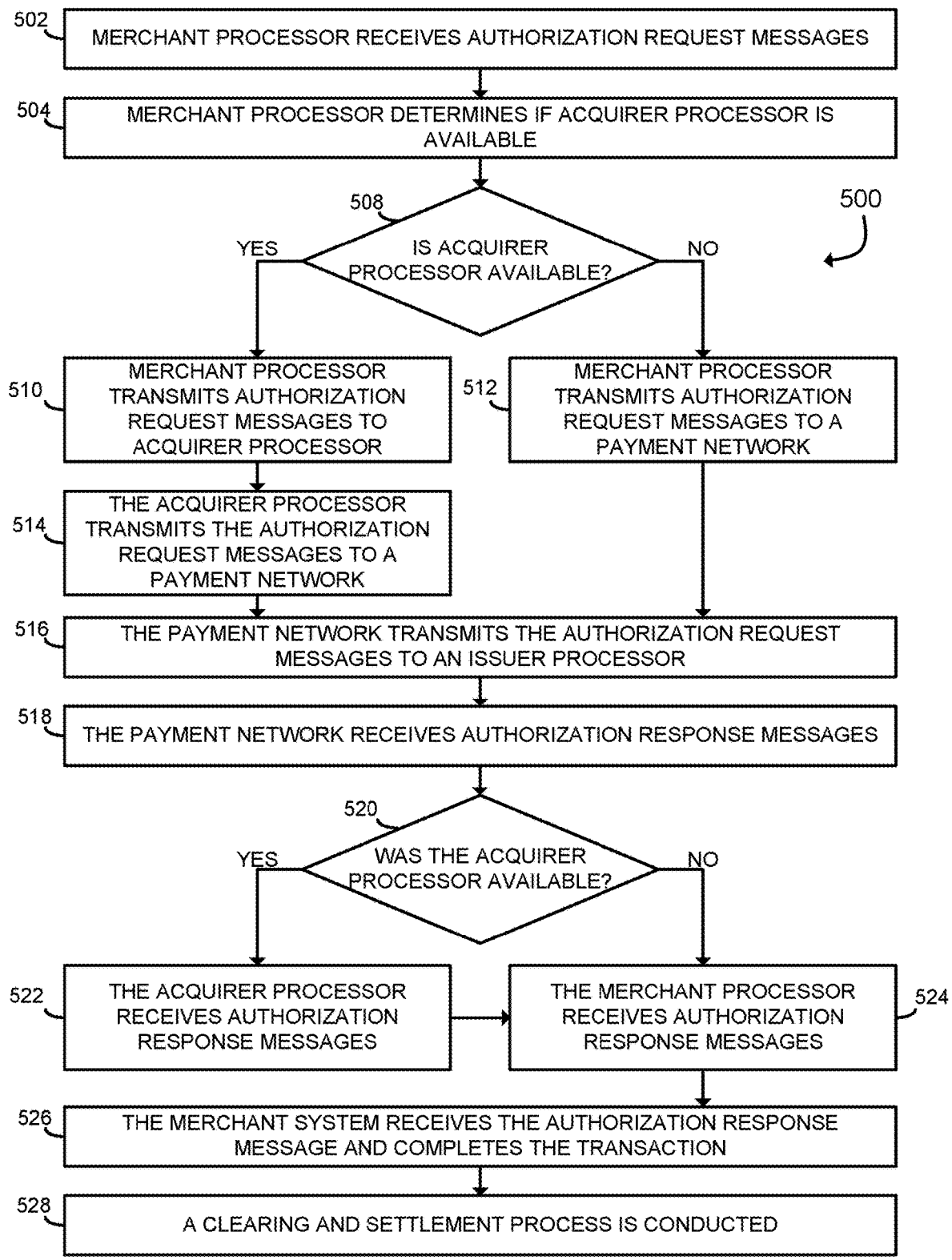
FIG. 5 is a flowchart showing a method of fallback authorization routing according to embodiments of the invention.

FIG. 5 shows a method 500 for fallback authorization routing through a system 100 shown in FIG. 1.

At step 502, the merchant processor receives authorization requests messages from one or more merchant systems. These merchant systems may have generated these authorization request messages during the course of several transactions. These authorization requests may be received as they are generated by the merchants. The merchant systems may also "bundle" multiple authorization requests into a single message that is received by the merchant processor.

These authorization request message may include payment credentials, such as a PAN, as well as transaction details, such as the following: consumer name, consumer billing address, consumer shipping address, consumer phone number, consumer account number, items purchased, price, etc. The authorization request message signifies that the merchant systems are engaged in transactions and wish to receive authorization for those transactions from the issuer processor which issued the payment credentials to the consumers.

At step 504, the merchant processor determines if the acquirer processor is available to receive authorization request messages. A variety of techniques may be used to detect the availability of the corresponding acquirer processor; further details are provided in a subsequent section and shown in FIGS. 6-8. Additionally, the merchant processor may have determined that the acquirer processor was unavailable at a prior point in time. In this case, the merchant processor may check memory for a flag or other data indicating the unavailability of the acquirer processor.

As examples, availability detection may involve transmitting handshake messages to the acquirer processor and comparing the number of responses to the number of transmitted handshake messages. In establishing a communication channel with the acquirer processor, the merchant processor may transmit a handshake message, which is used in order to establish the communication channel for later, more substantive communication. Handshake messages are typically replied to with a responding handshake message, indicating that the recipient (i.e., the acquirer processor) is receptive to communication, or establishing the rules dictating the transmission of packets or octets over the communication channel. If a handshake response is not received, communication may not proceed. Therefore the rate or ratio of missed or rejected handshake messages to the total number of handshake attempts is a strong indicator of the availability of the acquirer processor to send and receive authorization requests and authorization responses.

Alternatively or in combination, the merchant processor can receive a series of heartbeat messages from the acquirer processor at a predetermined rate and determine the availability based on whether the predetermined rate has been sustained. The merchant processor may calculate the ratio of missed heartbeat message to the total number of expected heartbeat messages over a predetermined time period and compare the ratio to a threshold in order to determine availability. As a further example, the merchant processor may receive a communication or indication from the acquirer processor explicitly stating whether the acquirer processor is available.

At step 508, the method flow splits depending on the availability of the acquirer processor. If the acquirer processor is available, flow proceeds to step 510 for sending the authorization request to the merchant processor. If the acquirer processor 108 is unavailable, flow proceeds to step 512 for sending the authorization request to the payment network.

At step 510, after determining that the acquirer processor is available to receive authorization request messages, the merchant processor may transmit the authorization request messages to the acquirer processor. This transmission may occur over the first communication channel. The authorization request message may be transmitted in any suitable format.

At step 514, the acquirer processor transmits the authorization request messages to the payment network so that the payment network can route the authorization request to an appropriate issuer processor.

At step 512, after determining that the acquirer processor is unavailable or unable to receive authorization request messages, the merchant processor transmits the authorization request messages to the payment network. This transmission occurs over the second communication channel. In this way, the acquirer processor is bypassed, enabling the payment network to route the authorization request message to the appropriate issuer processor even though the acquirer network is unavailable.

At step 516, the payment network transmits the authorization request messages to the appropriate issuer processor. This may involve the payment network interpreting the authorization request to extract the necessary routing information.

At step 518 after the issuer processor has approved or denied the authorization request message, the payment network receives an authorization response message from the issuer processor to indicate whether or not authorization was accepted or rejected, or whether more information is needed in order to authorize.

At step 520, the method flow splits based on the availability of the acquirer processor. If the acquirer processor was determined to be available, flow proceeds to step 522. If the acquirer processor was determined to be unavailable, flow proceeds to step 524. There are various ways by which the payment network could know the acquirer processor was available or unavailable. As an example, the authorization request message could contain a field or section that indicates whether or not the request message was routed through the first or second communication channel. This field could be maintained and included when an authorization response message is formed. By interpreting the authorization response message, the payment network knows whether or not the acquirer processor was determined to be available or unavailable.

As another example, the payment network could, through the use of its routing module, determine the communication channel used for the original payment request message and record a note, flag, or other data indicator in memory that indicates the communication channel. For example, upon receiving an authorization request message, the routing module could make note of its origin. The authorization request message could be interpreted, and some code or hash could be constructed based on its contents and associated, in memory, with the determined origin. When an authorization response message is received, the payment network could interpret the authorization response message and attempt to construct a second hash based on its contents. The payment network could search its memory for a hash matching the second hash, and extract the communication channel origin associated in memory. In doing so the payment network could track the source for each request and determine how to route each response.

At step 522 after the acquirer processor determines that the acquirer processor was available, the acquirer processor receives the authorization response messages from the payment network. The acquirer processor then forwards the authorization response messages to the merchant processor.

At step 524, the merchant processor receives the authorization response messages either from the payment network (if the acquirer processor is unavailable) or from the acquirer processor (if the acquirer processor is available).

At step 526, the merchant system receives the authorization response messages from the merchant processor. At this stage, the merchant system now knows whether or not the transactions has been approved or declined. The merchant system may complete the transactions.

At step 528, at the end of the day, or at a period determined by the merchant, a normal clearing and settlement process can be conducted. A clearing and settlement process may include a process of reconciling a transaction. A clearing process is a process of exchanging financial details between an acquirer computer and an issuer computer to facilitate posting to a party's account and reconciliation of the party's settlement position. Settlement involves the delivery of securities from one party to another. In some embodiments, clearing and settlement can occur simultaneously.

In some special cases, the acquirer processor server may not be available during the settlement process. However, the acquirer may maintain a backup acquirer processor server. Settlement processes and transmission of settlement requests may pass from the merchant processor to the backup acquirer processor server through a third communication channel. The backup acquirer processor server may, for all intents and purposes, generally exhibit the same structure and function of the acquirer processor server discussed above.

III. Detecting Availability

Detecting availability generally involves a statistical analysis of messages sent between the merchant processor and the acquirer processor over the first communication channel.

One such method of detecting availability, recited below, involves the analysis of messages received by the merchant processor from the acquirer processor. Some messages, such as handshaking messages, are used in typical networking configurations to establish a communication channel between two entities. If the merchant processor sends a handshake message to the acquirer processor and the acquirer processor does not respond with its own handshaking message, communication would typically not proceed. Therefore, a merchant processor may count the number of handshake message responses in order to determine the quality of communication between the merchant processor and the acquirer processor. If only a small fraction of handshake messages are responded to, it may indicate that the acquirer processor is unavailable to receive future authorization request messages.

The merchant processor may not necessarily need to count handshake messages in order to determine the availability of the acquirer processor. In some embodiments, after the merchant processor sends an authorization request to the acquirer processor, the acquirer processor may send a message back to the merchant. This "acknowledgement response," "acknowledgement message," or "acknowledgement receipt" indicates to the merchant processor that the acquirer processor received the authorization request message. The merchant processor may count the number of acknowledgement responses over a predetermined time period. If only a small fraction of acknowledgement messages are responded to, it may indicate that the acquirer processor is unavailable to receive future authorization request messages.

In other embodiments, the merchant processor may count authorization response messages. The merchant processor may compare the count of authorization response messages to a prior count of authorization request messages. If the merchant processor sent some number of authorization request messages and received a significantly smaller number of authorization response messages, that would indicate that the acquirer processor is unavailable.

Another such method of detecting availability could involve the statistical analysis of heartbeat messages. A heartbeat message can involve repeated transmission of messages indicating that an entity is available to communicate over a channel. A steady stream of heartbeat messages indicates a "healthy" connection, an unsteady heartbeat signal may indicate network issues including acquirer processor unavailability. By analyzing the amount of heartbeat messages received versus the expected number of heartbeats received over some predetermined time period, the availability of the acquirer processor may be determined.

It is noted that there are many ways to send and receive messages for the purposes of determining whether or not a message has been received by the acquirer processor. An authorization request message could additionally contain an encrypted portion. The acquirer processor could unencrypt the encrypted portion and send it back as an acknowledgement message. This would indicate to the merchant processor that the acquirer processor received the message, and that the message was not corrupted, because a corrupted message cannot be properly decrypted. The examples provided below are intended to be illustrative and not restrictive.

A. Ratio of Failed Transmissions

FIG. 6 shows a method 600 for detecting the availability of the acquirer processor using handshake messages, acknowledgement responses, or authorization responses according to an embodiment of the invention.

At step 602, the merchant processor sends either a handshake message or an authorization request to the acquirer processor over the first communication channel. The handshake message could include any information required for the handshaking procedure. The handshaking procedure is used in many different transmission protocols, such as the "Transmission Control Protocol" or TCP, and is used to establish a stable communication channel before more substantive communications take place, such as the transmission of authorization request messages.

This handshaking process may involve first sending, by the merchant processor, a first handshake message to the acquirer processor. The first handshake message may indicate to the acquirer processor that a merchant processor wishes to establish a communication channel. The first handshake message may include information such as a network address at which the merchant processor can be reached at. It may also include an indicator or code that informs the acquirer processor of a communication or handshaking protocol. The handshaking message sent in step 602 may be analogous to the first handshake message described above. Additionally, the handshake message sent in step 602 may be a later message sent as part of the handshaking process. The handshaking message may be represented as a stream of octets, groups of eight bits. It may also be represented in a different data structure. The size and the amount of data in the handshaking message may depend on the nature of the handshaking procedure or the network.

At step 604, the merchant processor waits a predetermined time period for the acquirer processor to respond to either the handshake message or the authorization request. The predetermined time period may be based on the volume of transactions processed by the merchant processor or by other factors or empirical observations. For example, if experimentation determines that a specified percentage (e.g., 99.99%) of response handshake messages, authorization responses, or acknowledgement responses occur within 30 milliseconds of sending the handshake message or authorization request message, the predetermined time period may be 30 milliseconds.

At step 606, the merchant processor determines if the acquirer processor has responded to the handshake message or the authorization request. If the acquirer processor has responded to the handshake message or authorization request, flow proceeds to step 614. If the acquirer processor has not responded to the handshake message or authorization request, flow proceeds to step 608. For a handshake message, this may involve evaluating whether the merchant processor has received a valid response to a handshake message during the predetermined time period. For some communication protocols, the sender, (e.g., the merchant processor) might expect a specifically formatted handshake message response. As an example, the sender may expect the first eight octets to correspond to a network address, the second 2 octets to correspond to a timestamp, and a final octet to correspond to an "operation code," which indicates the next step in the handshaking process. Because an invalid response to the handshake message will not allow the handshaking process to continue, the merchant processor may determine that the acquirer processor did not respond to the handshake message if the acquirer processor is unable to send a valid response.

When the message is an authorization request message, the response from the acquirer processor may be either an acknowledgement response or an authorization response. As stated above, an acknowledgement response may be used in some network communication protocols in order to verify that a message has been received. The acquirer processor may be expected to provide an authorization response, either as a stream of octets or another data structure after receiving any substantial communication from the merchant processor.

At step 614, when the merchant processor determines that the acquirer processor has responded to the message, the merchant processor records a connection success. Methods of recording connection successes and failures are discussed in further detail below.

At 608, when the merchant processor determines that the acquirer processor has not responded to the message, the merchant processor determines if it has made a predetermined number of attempts to reach the acquirer processor.

The advantage of repeatedly attempting to reach the acquirer processor is evident from a statistical perspective. If 90% of communications receive a response to message, one out of ten communications will fail. However, if the response probability is independent, the probability of four communications failing to receive a responses to message is only one out of 10,000, a much lower failure rate.

At step 612, when the merchant processor has not made a predetermined number of attempts to reach the acquirer processor, the merchant processor increments an attempt counter, which serves as a record of the number of attempts made by the merchant processor. The attempt counter may be a software counter, or it may be implemented as a specialized piece of hardware. In either case, the attempt counter can be incremented or read by the merchant processor. Flow proceeds back to step 602, and the merchant processor makes another attempt to reach the acquirer processor, repeatedly doing so until the acquirer processor either response to the message or the merchant processor has made a predetermined number of attempts.

At step 610, when the merchant processor has made a predetermined number of attempts to reach the acquirer processor (e.g., as confirmed by comparing the value of the attempt counter to the predetermined number of attempts), the merchant processor records a connection failure, indicating that a message was not responded to by the acquirer processor. This connection failure could include information such as a timestamp, which indicates the time at which the connection failure occurred.

The merchant processor may make use of memory or other specialized hardware to record a connection failure or success. In some cases, the memory could contain a data structure of a fixed width, such as an array. For example, the array could be two rows by N columns. The first row could correspond to a series of timestamps, such as [00:00, 00:01, . . . 59:59], a count up from zero minutes and zero seconds to 59 minutes and 59 seconds. As time passes, a pointer or other iterator could advance through each column of the array. For example, at 23 minutes and 39 seconds, the iterator could point to the $1419^{th}$ column in the array. At either step 610, corresponding to a case where the message was not responded to, or at step 614, corresponding to the case where the message was responded to, the merchant processor could record an indication in the memory corresponding to the column pointer to by the iterator and the second row. This indication could be a Boolean value, such as TRUE or FALSE, indicating that the message was responded to or wasn't responded to respectively. Further, the indication could be another code. For example, the indication could be "SUCCESS," "FAILURE," or "NO DATA," corresponding to a connection success, a connection failure, or to a lack of data at that point in time.

As the iterator reaches the last entry in the array [59:59], it may return to the first entry in the array. In this way the merchant processor repeatedly iterates through the array once per hour and rewrites the entries at each timestamped column. In this way the merchant processor records a timestamped one hour running count of connection failures and successes. In some cases, it may be advantageous to record a longer counter, a shorter count, or a count with greater or lesser temporal resolution, such that the difference between consecutive timestamps is less than or greater than one second.

As another example, a merchant processor may instead use a counting scheme consisting of two counter variables and a timer. As time passes, the timer independently increases up to a predetermined value, such as 59:59. Both counter variable begins at 0, and the first counter variable increases by one each time a connection failure is recorded. The second counter variable increase by one each time a connection success is recorded. When the timer reaches the predetermined value, the timer and counters may reset. In this way the counter keeps a running count of the number of connection failures and successes during a one hour period.

The above recording methods are intended to be illustrative, there are several ways in which connection failures and successes could be recorded. Further, there are numerous appropriate software or hardware structures which may be used to count connection failures or successes. Additionally, recording and counting methods don't necessarily need to occur over a predetermined time frame or as a running count.

At step 616, the merchant processor may determine the ratio of failed connections to attempted connections. This may be over a predetermined time period (e.g., 10 minutes) or a transaction window (e.g., 10,000 attempted connections), or it may be from an arbitrary point in time.

As an example, if over a predetermined time period, 242 connection failures occur and 9,758 successful connections occurred, the total number of connection attempts is 10,000. Using one of the above counting methods, the merchant processor could determine the total number of connection attempts by adding the value of each counter variable. The merchant processor could determine the ratio of connection failure to attempted connections over the predetermined time period by using hardware or software designed to perform arithmetic. In doing so, the merchant processor determines the ratio is 242/10,000 or 0.00242. This value may be compared to a threshold value. This threshold value could be based off empirical observation or an organizational objective. For example, an organization may determine experimentally that there is a strong correlation between merchant satisfaction with the merchant processor and the ratio of connection failure to attempted connections, such that merchant satisfaction drops to unacceptable levels when the ratio of connection failure to attempted connections is 0.005 or greater. In this case, the organization may determine that the threshold value should be 0.005.

As another example, using the other above counting method, the merchant processor could count the total number of connection failures and divide that by the total length of the array in order to produce the ratio. There are many ways by which a merchant processor could count and calculate a ratio.

In some embodiments, the ratio may be calculated continuously or near continuously. For example, every second or half second the merchant processor could determine the ratio and compare it to a threshold value. In situations where the merchant computer system generates a high volume of authorization request messages, this may be ideal. In other situations, such as when a merchant computer system generates a low volume of responses, it may be ideal to calculate the ratio every hour or two hours. Additionally, the ratio could be calculated only when a set condition is met. For example, if the last five or more connection attempts failed, the merchant processor may calculate the ratio, and not do so at any other time. Additionally, the merchant processor may possess an array stored on a computer readable medium in which the merchant processor stores calculated ratios and a timestamp at which the ratio was calculated. In this way the merchant processor could have a running record detailing how the ratio of connection failures to connection attempts changes over time.

Calculating the ratio of connection failures to attempted connections may be accomplished in different ways depending on organizational objectives or the needs of different merchant systems. A merchant system which processes transactions at a low rate, such as 20 transactions per day during business hours would not be served well by evaluating the connection failure ratio in 10,000 transaction windows. Likewise, evaluating the transaction ratio over a 10 minute period would be ineffective, as over a 480 minute business day, the merchant expects less than a single transaction every 10 minutes.

At step 618, the merchant processor determines whether or not the ratio of connection failures to accepted connections exceeds the predetermined threshold. If the merchant processor determines that the number of connection failures to accepted connections exceeds the predetermined threshold, the merchant processor may proceed to step 620, otherwise, the merchant processor may proceed to step 622.

At step 620, the merchant processor, having determined that the ratio of connection failures to attempted connection exceeds the predetermined threshold value may determine the acquirer processor is unavailable. The merchant processor may update a flag or other value stored in memory to indicate that the acquirer processor is unavailable.

At step 622, the merchant processor, having determined that the ratio of connection failures to attempted connections does not exceed the predetermined threshold value may determine the acquirer processor is available, despite not responding to the handshake synchronization message sent in step 602. Like in step 620, the merchant processor may update a value stored in memory, such as a flag, to indicate that the acquirer processor is available.

B. Heartbeat Message

FIG. 7 shows a method 700 of determining acquirer processor availability using heartbeat messages.

At step 702, the merchant processor waits for a heartbeat message from the acquirer processor. A heartbeat message may be a message that is sent during the absence of other communications and indicate that the acquirer processor is "alive," in the sense that it is receptive to communication over the first communication channel. The heartbeat message may be sent during a regular interval, or over an irregular, but known schedule. A heartbeat message may, for example be sent once per second in the absence of other communication.

At step 704, the merchant processor evaluates whether it received a heartbeat message from the acquirer processor. If the merchant processor received a heartbeat message, nothing out of the ordinary is occurring and the availability of the acquirer processor is expected to be unchanged. In this case, flow proceeds back to step 702.

At step 706, the merchant processor records a missed heartbeat. There are numerous ways in which the merchant processor could record a missed heartbeat. For example, the merchant processor could maintain a count of missed heartbeats, or a count of both missed heartbeats and received heartbeats using software or hardware. For example, the merchant processor could maintain a variable stored in memory which is incremented as heartbeats are missed. As a second example, the merchant processor could maintain a two row by N column array, where each column corresponds to a missed or received heartbeat and a timestamp.

At step 708, the merchant processor calculates a ratio of recorded missed heartbeats to expected heartbeats over a predetermined time period. For example, the predetermined time period could be five minutes long. In some cases it may be advantages to have a shorter time period, if for example the heartbeat rate is high, or a longer time period if the heartbeat rate is low. As in FIG. 6, there may be other ways of calculating the ratio depending on the needs of the merchant systems. For example, the ratio may be calculated against the last 10000 heartbeats, rather than against the number of heartbeats in a predetermined timeframe. Calculating the ratio may involve iterating through the data structure holding the heartbeat recordings and calculating the number of missed heartbeats versus the total number of heartbeats. It may also involve determining an elapsed time value (e.g., recorded by a software or hardware timer) and calculating an expected number of heartbeat messages as the product of the elapsed time and the known heartbeat message rate. The ratio can then be calculated by dividing the recorded number of missed heartbeats by the total number of heartbeats.

The predetermined threshold, like in FIG. 6, could be determined in a number of ways, including experimentation or a data-driven approach and could vary by merchant system.

At step 710, the merchant processor determines whether the ratio exceeds the predetermined threshold. If the ratio does not exceed the predetermined threshold, flow can continue back to step 702. Otherwise, flow continues to step 712.

At step 712, the merchant processor determines, based on the observation that the ratio exceeds a predetermined threshold, that the acquirer processor 108 is unavailable. Flow again proceeds back to step 702 and the merchant processor resumes listening for heartbeats and counting missed and received heartbeats.

C. Switching Back to First Communication Channel

In some embodiments of the invention, after the acquirer processor is determined to be unavailable, future communications are routed through the second communication channel until the acquirer processor is determined to be available again.

FIG. 8 shows a method 800 for determining availability of the acquirer processor by receiving an indication from the acquirer processor. This indication could take the form of a communication, such as an electronic message or email indicating the acquirer processor is available, sent after the acquirer processor was found to be unavailable.

At step 802, the merchant processor determines the acquirer processor 108 is unavailable, this determination may be a result of either methods 600 or 700 shown in FIGS. 6 and 7 respectively, or another method of determining acquirer processor availability.

At step 804, the merchant processor may transmit the authorization requests to the payment network over the second communication channel in order to bypass an unavailable acquirer processor. This is consistent with a situation where the merchant processor has previously determined the acquirer processor is unavailable and is routing all future authorization requests and responses through the second communication channel.

At step 806, the merchant processor, which is still monitoring communication over the first communication channel, receives indication from the acquirer processor indicating that the acquirer processor is available. This may occur when the acquirer processor has become available or come online again. It may also occur if the merchant processor had misidentified the availability of the acquirer processor. The indication may take many different forms. In some cases, the indication may be resumed heartbeat messages sent to the merchant processor from the acquirer processor over the first communication channel. In other cases, it may be a specially tailored message sent on the first communication channel, or via a third communication channel. Still further, it may involve the acquirer associated with the acquirer processor calling, emailing, or otherwise indicating to the entity associated with the merchant processor that service has resumed.

At step 808, in response to the indication from step 806, the merchant processor determines that the acquirer processor is available. This determination could be automatic, or in some cases could involve a further evaluation of the acquirer processor's availability. As an example, the merchant processor could send a series of messages to the acquirer processor, such as handshake messages or subsequent authorization requests and evaluate the response rate, determining that the acquirer processor is available if it exceeds a predetermined ratio, much like the methods described in FIGS. 6-7.

At step 810, having determined that the acquirer processor is once again available, the merchant processor resumes sending authorization request messages to the available acquirer processor over the first communication channel.

In some embodiments of the invention, the methods outlined in FIGS. 5-8 could be combined, performed in different order, or have steps removed or added as necessary. In some cases it may be advantages to evaluate both heartbeats and responses to messages in order to more accurately determine whether the acquirer processor is available. In other applications, it may be appropriate to make assumptions about acquirer processor availability, periodically setting the availability of the acquirer processor to available even in the absence of indication from the acquirer processor.

Moreover, other methods may be adopted to determine acquirer processor availability. For example, transactions from a single, smaller merchant system may be routed to an "unavailable" acquirer processor while all other transactions are routed through the bypass channel, the second communication channel. If the transactions from the single, smaller merchant system appear to be faithfully routed through the acquirer processor, the merchant processor may assume that the acquirer processor is available, despite a previous determination that it was unavailable, and despite a lack of indication received from the acquirer processor as to its availability.

IV. Settlement

The settlement process can be dependent on whether or not the acquirer processor was available during the initial authorization request message. If the acquirer processor was available, it is expected to possess some authorization record or authorization log indicating that the transaction was authorized. However, if the acquirer processor was unavailable, the acquirer processor would not have that record; and therefore, during the settlement process, the acquirer processor may not know that the transaction was authorized.

To this end, embodiments can facilitate the transmission of an authorization log or other record from the merchant processor to the acquirer processor, such that the acquirer processor has all the information necessary to verify the transaction and take part in the settlement process.

Figure 9:
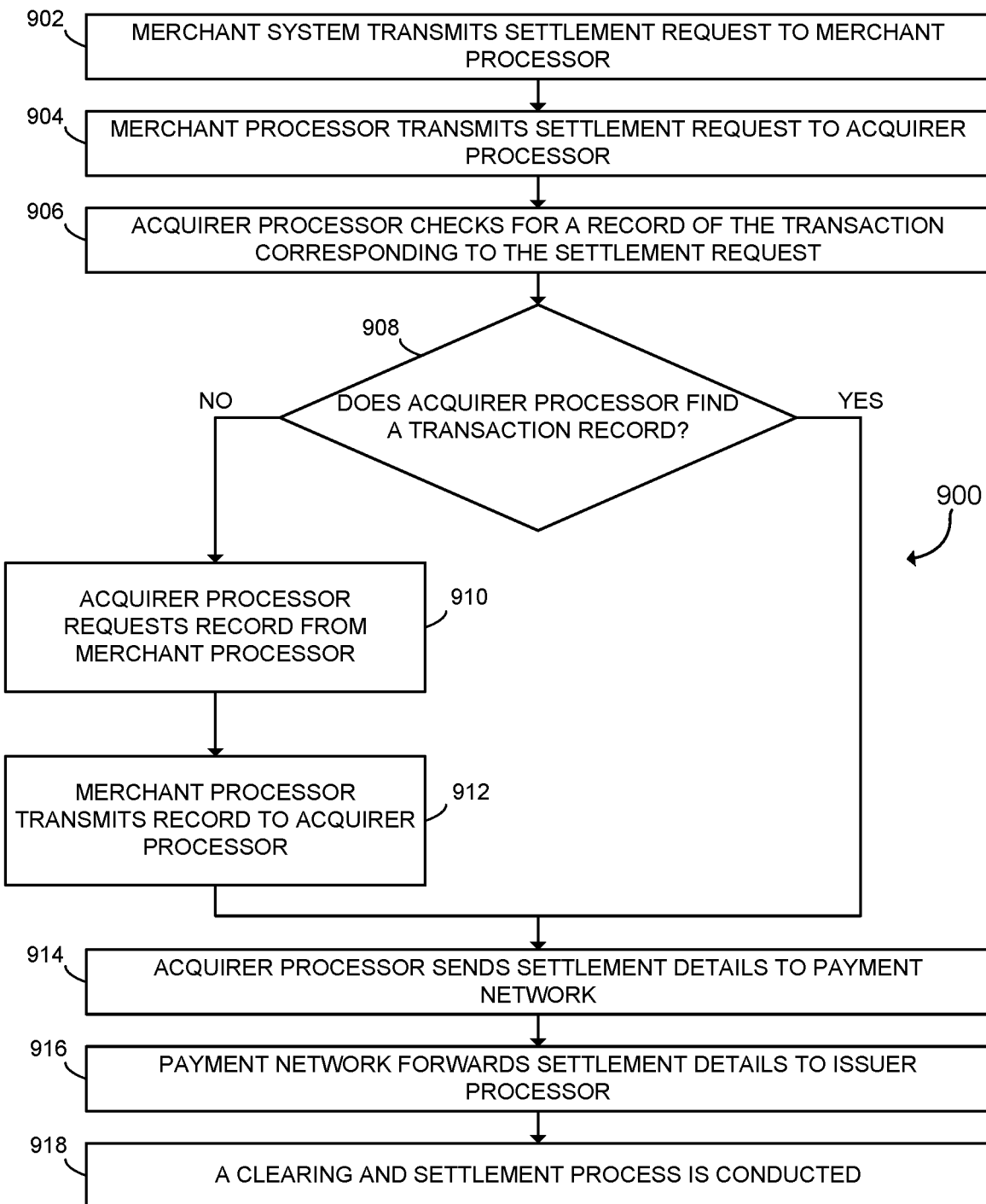
FIG. 9 is a flowchart showing a method of providing transaction information to the acquirer processor as part of a settlement process according to embodiments of the invention.

FIG. 9 shows a method 900 for settling a previously authorized transaction.

At step 902, the merchant system transmits a settlement request to the merchant processor. The settlement request indicates to the acquirer processor and the issuer processor that the merchant associated with the merchant system wishes to settle a previously authorized transaction. This may be accomplished by debiting a payment account controlled by the issuer processor and associated with a consumer and crediting a payment account controlled by the acquirer processor and associated with the merchant system.

The settlement request may further include information which allows the merchant processor, the acquirer processor, the payment network, and the issuer processor to identify the transaction in question, as well as the participating acquirer processor and issuer processor, and the accounts in question. It may further include personally identifying information, and transaction timestamps.

At step 904, the merchant processor transmits the settlement request to the acquirer processor. This could be accomplished over the first communication channel.

At step 906, the acquirer processor checks for a record of the transaction corresponding to the settlement request. The acquirer processor may do this to verify that the transaction is non-fraudulent, actually took place, or to verify that the transaction was routed through the acquirer processor rather than through the second communication channel.

At step 908, the acquirer processor searches its internal memory to find an authorization record corresponding to the transaction being settled. This could involve extracting information from the settlement request, including a transaction ID or authorization code and attempting to match that code to an entry in a database or another storage element. If the acquirer processor cannot find a record of the transaction being settled, flow proceeds to step 910. If the acquirer processor can find a record of the transaction being settled, flow proceeds to step 914.

At step 910, the acquirer processor requests an authorization record from the merchant processor. If the payment network has an authorization record of the transaction, the acquirer processor may be sure that the transaction is non-fraudulent and actually took place, despite not being routed through the acquirer processor. This request may include the settlement request, or information extracted from the settlement request which would allow the merchant processor to search internal memory or other computer readable media to find an authorization record. Such an authorization record may be found using an authorization code or other identifying information originally included in the authorization request or response.

At step 912, the merchant processor may transmit this record to the acquirer processor over the first communication channel so that the acquirer processor may verify its contents. The record may include any of the information recited above, specifically information which allows the merchant processor, the acquirer processor, the payment network, and the issuer processor to identify the transaction, the time and conditions under which it took place and the entities involved.

In some cases, the acquirer processor server may still be unavailable. However, the acquirer may maintain a second, backup acquirer processor server. In this case, the backup acquirer processor server may request the authorization record from the merchant processor, either over the first communication channel or a third communication channel. Subsequent communications between the acquirer processor server and other computers may be conducted between those computers and the backup acquirer processor server over the third communication channel.

At step 914, the acquirer processor, either having retrieved the transaction record from its own memory or the merchant processor may now send the settlement details to the payment network in order to advance the settlement process.

At step 916, the payment network forwards the settlement details to the issuer processor. At this point, each entity involved in the transaction has received the settlement details and the settlement process can be completed.

At step 918, at the end of the day, or at a period determined by the merchant, a normal clearing and settlement process can be conducted. A clearing and settlement process may include a process of reconciling a transaction. A clearing process is a process of exchanging financial details between an acquirer computer and an issuer computer to facilitate posting to a party's account and reconciliation of the party's settlement position. Settlement involves the delivery of securities from one party to another. In some embodiments, clearing and settlement can occur simultaneously.

V. Computer System

Figure 10:
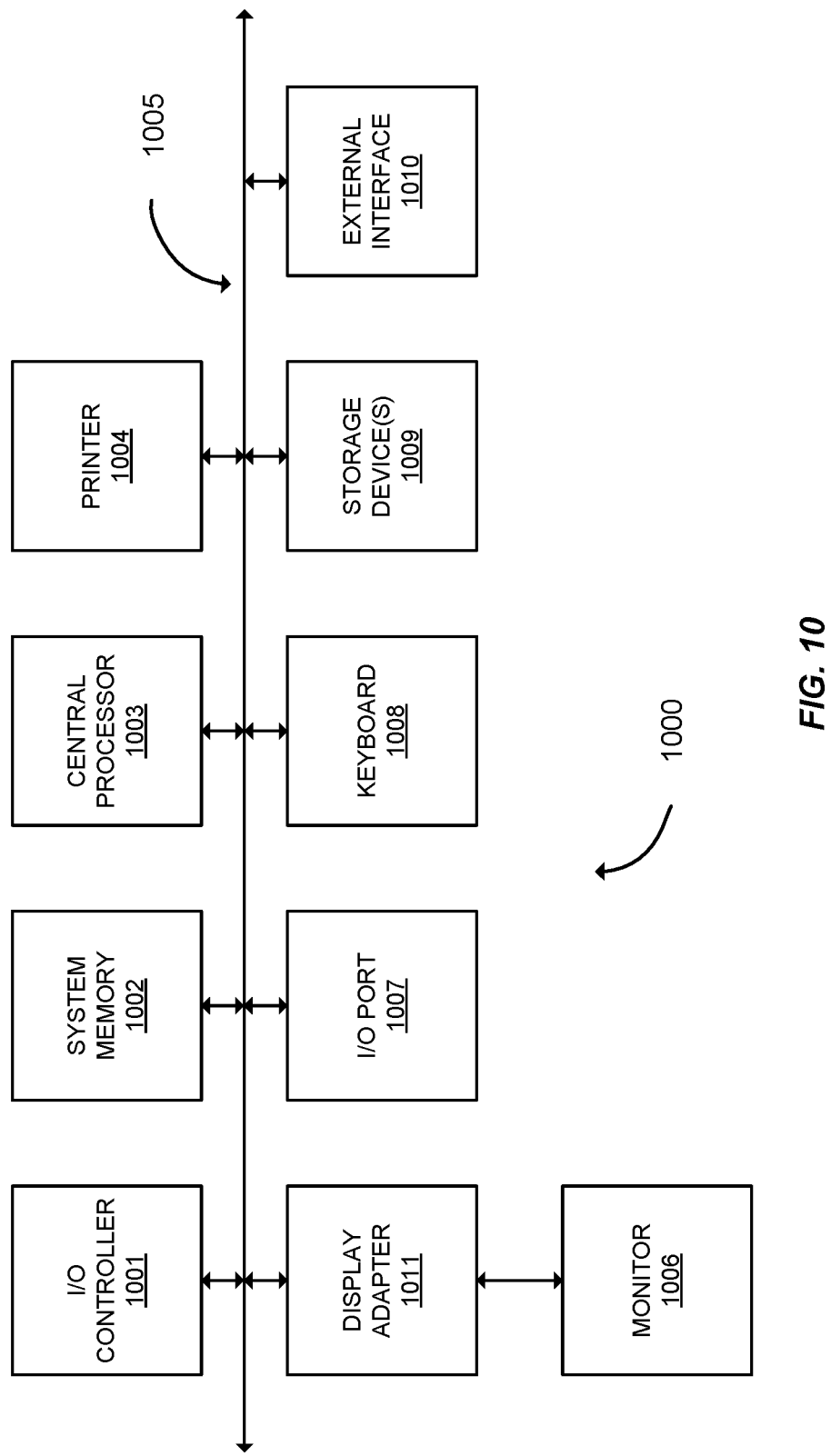
FIG. 10 is a block diagram showing a computer system according to embodiments of the invention.

Any of the computer systems mentioned herein may utilize any suitable number of subsystems. Examples of such subsystems are shown in FIG. 10 in computer apparatus 1000. In some embodiments, a computer system includes a single computer apparatus, where the subsystems can be components of the computer apparatus. In other embodiments, a computer system can include multiple computer apparatuses, each being a subsystem, with internal components.

The subsystems shown in FIG. 10 are interconnected via a system bus 1005. Additional subsystems such as a printer 1004, keyboard 1008, storage device(s) 1009, monitor 1006, which is coupled to display adapter 1011, and others are shown.

Peripherals and input/output (I/O) devices which couple to I/O controller 1001, can be connected to the computer system by any number of means known in the art such as input/output (I/O) port 1007 (e.g., USB, FireWire®). For example, I/O port 1007 or external interface 1010 (e.g. Ethernet, Wi-Fi, etc.) can be used to connect computer system 1000 to a wide area network such as the Internet, a mouse input device, or a scanner. The interconnection via system bus 1005 allows the central processor 1003 to communicate with each subsystem and to control the execution of instructions from system memory 1002 or the storage device(s) 1009 (e.g., a fixed disk, such as a hard drive or optical disk), as well as the exchange of information between subsystems. The system memory 1002 and/or the storage device(s) 1009 may embody a computer readable medium. Any of the data mentioned herein can be output from one component to another component and can be output to the user.

A computer system can include a plurality of the same components or subsystems, e.g., connected together by external interface 1010 or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising performing, by a merchant processor gateway:

receiving, from one or more merchant computer systems, first authorization requests corresponding to a first set of transactions;

sending, via a first network communication channel between the merchant processor gateway and an acquirer processor server, the first authorization requests to the acquirer processor server that forwards the first authorization requests to a payment network;

determining an availability of the acquirer processor server;

after determining the availability of the acquirer processor server:

receiving, from the acquirer processor server, first authorization responses; and sending the first authorization responses to the one or more merchant computer systems, thereby causing completion of the first set of transactions;

subsequently, determining an unavailability of the acquirer processor server, wherein determining the availability and the unavailability of the acquirer processor server involves:

receiving a number of heartbeat messages from the acquirer processor server over a time period, comparing the number of heartbeat messages received over the time period to an expected number of heartbeat messages to be received over that time period, the expected number of heartbeat messages determined based on a specified heartbeat message rate and a length of the time period, when a difference between an expected number of heartbeat messages received and the number of heartbeat messages received is less than a predetermined threshold value, determining the acquirer processor server to be available, and when the difference between the expected number of heartbeat messages received and the number of heartbeat messages received is greater than the predetermined threshold value, determining the acquirer processor server to be unavailable;

after determining the unavailability of the acquirer processor server:

receiving, from the one or more merchant computer systems, second authorization requests corresponding to a second set of transactions;

sending, via a second network communication channel between the merchant processor gateway and the payment network that does not include the acquirer processor server, the second authorization requests to the payment network, thus bypassing the acquirer processor server;

receiving, from the payment network via the second network communication channel, second authorization responses; and sending the second authorization responses to the one or more merchant computer systems, thereby causing completion of the second set of transactions.

2. The method of claim 1, further comprising:

receiving, from the one or more merchant computer systems, capture requests corresponding to the second set of transactions; and sending the capture requests to the acquirer processor server or a backup acquirer processor server as part of a settlement process.

3. The method of claim 2, wherein sending the capture requests as part of a settlement process involves:

retrieving an authorization record from a non-transitory computer readable medium; and sending the authorization record and capture requests to the acquirer processor server as part of a settlement process.

4. The method of claim 2, wherein sending the capture requests as part of a settlement process involves:

sending the capture requests to the acquirer processor server over the first network communication channel as part of a settlement process as a forced capture.

5. The method of claim 2, wherein sending the capture requests as part of a settlement process involves:

sending the capture requests to a backup acquirer processor server over the first network communication channel or a third network communication channel as part of a settlement process.

6. The method of claim 2, further comprising:

extracting transaction information from the first authorization responses and storing the transaction information in a database; and sending the transaction information along with the capture requests to the acquirer processor server during the settlement process.

7. The method of claim 1, wherein determining the availability of the acquirer processor server involves:

determining a number of first authorization requests received by the acquirer processor server over the first network communication channel; and calculating a ratio of the number of first authorization requests received by the acquirer processor server to the number of first authorization requests, when the ratio of the number of first authorization requests received by the acquirer processor server to the number of first authorization requests is less than a predetermined threshold value, determining the acquirer processor server to be unavailable; and when the ratio of the number of first authorization requests received by the acquirer processor server to the number of first authorization requests is greater than a predetermined threshold value, determining the acquirer processor server to be available.

8. The method of claim 1, further comprising:

receiving an indication from the acquirer processor server over the first network communication channel or a third network communication channel indicating that the acquirer processor server is available to receive capture requests for a third set of authorization request messages.

9. A merchant processor gateway comprising:

a processor; and a non-transitory computer readable medium coupled to the processor, the non- transitory computer readable medium comprising code executable by the processor for performing a method comprising:

receiving, from one or more merchant computer systems, first authorization requests corresponding to a first set of transactions;

sending, via a first network communication channel between the merchant processor gateway and an acquirer processor server, the first authorization requests to the acquirer processor server that forwards the first authorization requests to a payment network;

determining an availability of the acquirer processor server;

after determining the availability of the acquirer processor server:

receiving, from the acquirer processor server, authorization responses;

determining an unavailability of the acquirer processor server, wherein determining the availability and the unavailability of the acquirer processor server involves:

receiving a number of heartbeat messages from the acquirer processor server over a time period, comparing the number of heartbeat messages received over the time period to an expected number of heartbeat messages to be received over that time period, the expected number of heartbeat messages determined based on a specified heartbeat message rate and a length of the time period,
when a difference between an expected number of heartbeat messages received and the number of heartbeat messages received is less than a predetermined threshold value, determining the acquirer processor server to be available, and
when the difference between the expected number of heartbeat messages received and the number of heartbeat messages received is greater than the predetermined threshold value, determining the acquirer processor server to be unavailable
after determining the unavailability of the acquirer processor server:
receiving, from the one or more merchant computer systems, second authorization requests corresponding to a second set of transactions;
sending, via a second network communication channel between the merchant processor gateway and the payment network that does not include the acquirer processor server, the second authorization requests to the payment network, thus bypassing the acquirer processor server;
receiving, from the payment network via the second network communication channel, second authorization responses; and
sending the second authorization responses to the one or more merchant computer systems, thereby causing completion of the second set of transactions.

10. The merchant processor gateway of claim 9, further comprising:
receiving, from the one or more merchant computer systems, capture requests corresponding to the second set of transactions; and
sending the capture requests to the acquirer processor server or a backup acquirer processor as part of a settlement process.

11. The merchant processor gateway of claim 10, wherein sending the capture requests as part of a settlement process involves:
retrieving an authorization record from the non-transitory computer readable medium; and
sending the authorization record and capture requests to the acquirer processor server as part of a settlement process.

12. The merchant processor gateway of claim 10, wherein sending the capture requests as part of a settlement process involves:
sending the capture requests to the acquirer processor server over the first network communication channel as a forced capture as part of a settlement process.

13. The merchant processor gateway of claim 10, wherein sending the capture requests as part of a settlement process involves:
sending the capture requests to a backup acquirer processor server over the first network communication channel or a third network communication channel as part of a settlement process.

14. The merchant processor gateway of claim 10, wherein the method further comprises:
extracting transaction information from the authorization responses and storing the transaction information in a database; and
sending the transaction information along with the capture requests to the acquirer processor server during the settlement process.

15. The merchant processor gateway of claim 9, wherein determining the availability of the acquirer processor server includes:
determining a number of first authorization requests received by the acquirer processor server over the first network communication channel; and
calculating a ratio of the number of first authorization requests received by the acquirer processor server to the number of first authorization requests,
when the ratio of the number of first authorization requests received by the acquirer processor server to the number of first authorization requests is less than a predetermined threshold value, determining the acquirer processor server to be unavailable; and
when the ratio of the number of first authorization requests received by the acquirer processor server to the number of first authorization requests is greater than a predetermined threshold value, determining the acquirer processor server to be available.

16. The merchant processor gateway of claim 9, wherein the method further comprises:
receiving an indication from the acquirer processor server over the first network communication channel or a third network communication channel indicating that the acquirer processor server is available to receive capture requests or a third set of authorization request messages.

* * * * *